(12) United States Patent
Tonomura et al.

(10) Patent No.: US 9,005,801 B2
(45) Date of Patent: Apr. 14, 2015

(54) BATTERY MODULE, ELECTRONIC APPARATUS, ELECTRIC POWER STORAGE SYSTEM, ELECTRIC POWER SYSTEM, AND ELECTRIC VEHICLE

(75) Inventors: Yasuhiro Tonomura, Fukushima (JP); Ryota Isshiki, Fukushima (JP); Ryo Tanabe, Fukushima (JP); Tetsuo Inakawa, Fukushima (JP)

(73) Assignee: Sony Corporation, Tokyo (JP)

( * ) Notice: Subject to any disclaimer, the term of this patent is extended or adjusted under 35 U.S.C. 154(b) by 402 days.

(21) Appl. No.: 13/482,745

(22) Filed: May 29, 2012

(65) Prior Publication Data

US 2012/0313559 A1 Dec. 13, 2012

(30) Foreign Application Priority Data

Jun. 9, 2011 (JP) ................................. 2011-129022

(51) Int. Cl.
| | | |
|---|---|---|
| *H01M 2/10* | (2006.01) | |
| *H01M 2/20* | (2006.01) | |
| H01M 10/50 | (2006.01) | |
| H01M 10/625 | (2014.01) | |
| H01M 10/647 | (2014.01) | |
| H01M 10/6557 | (2014.01) | |

(52) U.S. Cl.
CPC ............ *H01M 2/1077* (2013.01); *H01M 2/206* (2013.01); *H01M 10/5016* (2013.01); *H01M 10/5032* (2013.01); *H01M 10/5059* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 2011/0070474 A1* | 3/2011 | Lee et al. | 429/120 |
| 2011/0097614 A1 | 4/2011 | Kim | |
| 2012/0070718 A1 | 3/2012 | Motohashi | |
| 2012/0115004 A1* | 5/2012 | Park et al. | 429/120 |
| 2012/0135295 A1* | 5/2012 | Kim et al. | 429/159 |

FOREIGN PATENT DOCUMENTS

| | | |
|---|---|---|
| JP | 57-147865 | 9/1982 |
| JP | 59-086666 | 6/1984 |
| JP | 2001-155702 | 6/2001 |
| JP | 2003-068259 | 3/2003 |

(Continued)

OTHER PUBLICATIONS

Notification of Reason(s) for Refusal issued in connection with Japanese Patent Application No. 2011-129022, dated Aug. 26, 2014. (17 pages).

*Primary Examiner* — Jonathan Crepeau
(74) *Attorney, Agent, or Firm* — K&L Gates LLP

(57) ABSTRACT

A battery module includes a plurality of battery supports each having a face orthogonal to the stacking direction, and a side face, the battery supports each containing a plurality of cells and being made of an insulating material, a coupling part that is located between the face of one battery support and the face of another adjacent battery support, and contracts in the stacking direction upon stacking the battery supports to bring the faces of the battery supports into intimate contact, a group of cells including the battery supports stacked with the coupling part being placed between the battery supports, a base plate, and first and second regulating plates placed facing each other in a standing position on the base plate, the first and second regulating plates sandwiching the group of cells arranged between the first and second regulating plates and stacked with the coupling part being contracted.

36 Claims, 29 Drawing Sheets

(56) References Cited

FOREIGN PATENT DOCUMENTS

| | | |
|---|---|---|
| JP | 2005-071674 | 3/2005 |
| JP | 2005-108693 | 4/2005 |
| JP | 2007-280858 | 10/2007 |
| JP | 2007-294407 | 11/2007 |
| JP | 2008-270122 | 11/2008 |
| JP | 2010-205442 | 9/2010 |
| JP | 2011-060624 | 3/2011 |
| JP | 2011-091043 | 5/2011 |
| WO | 2006/067903 | 6/2006 |
| WO | 2008/007767 | 1/2008 |
| WO | WO 2011/030194 | * 3/2011 |

* cited by examiner

FIG. 10A
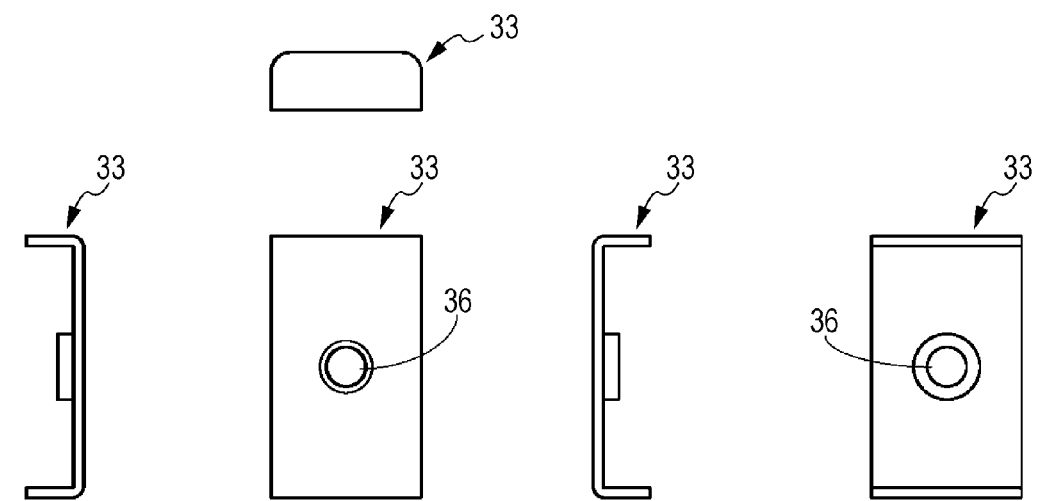
FIG. 10B
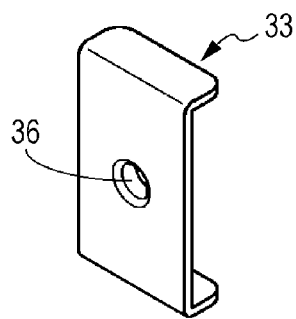

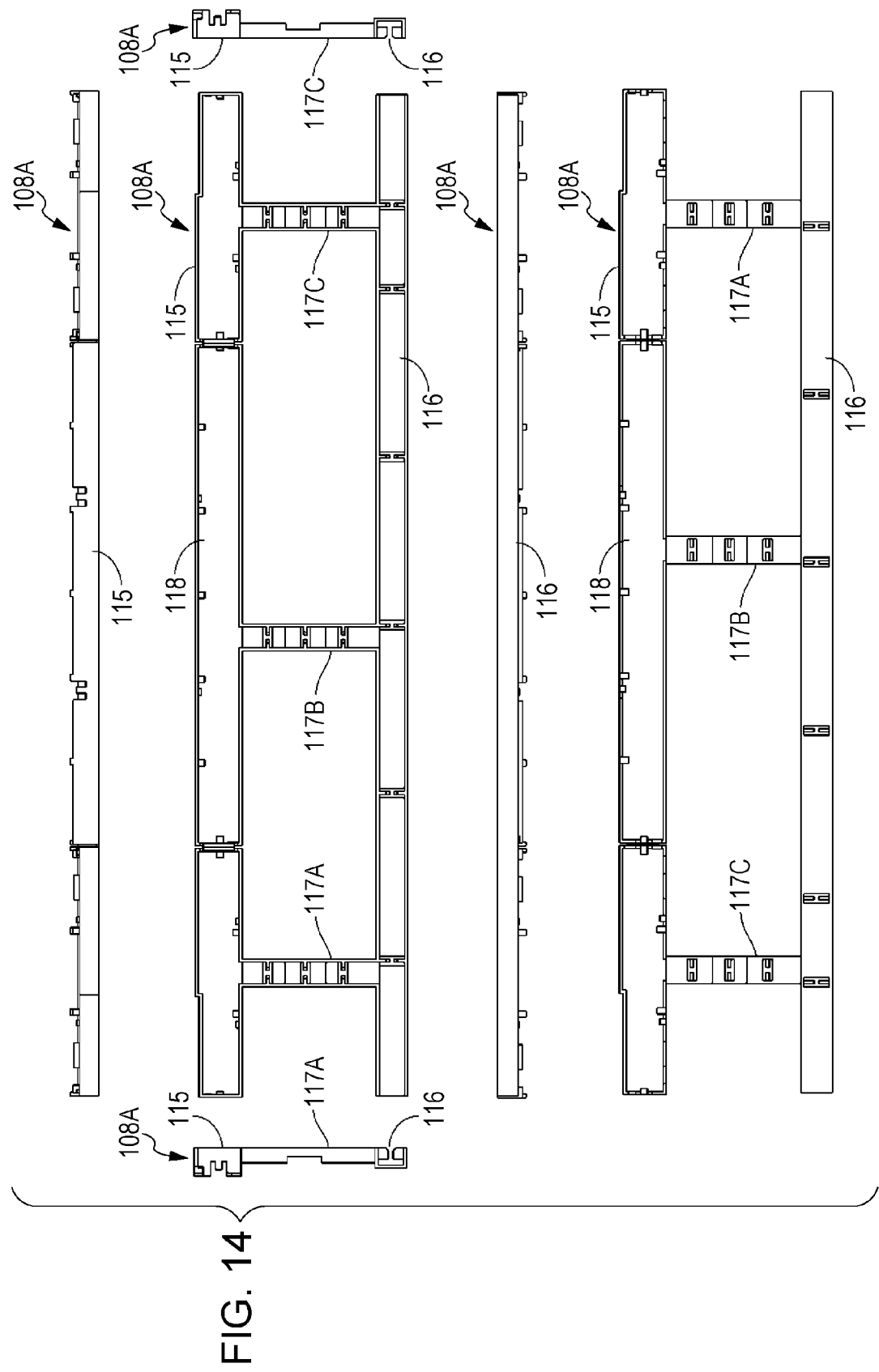

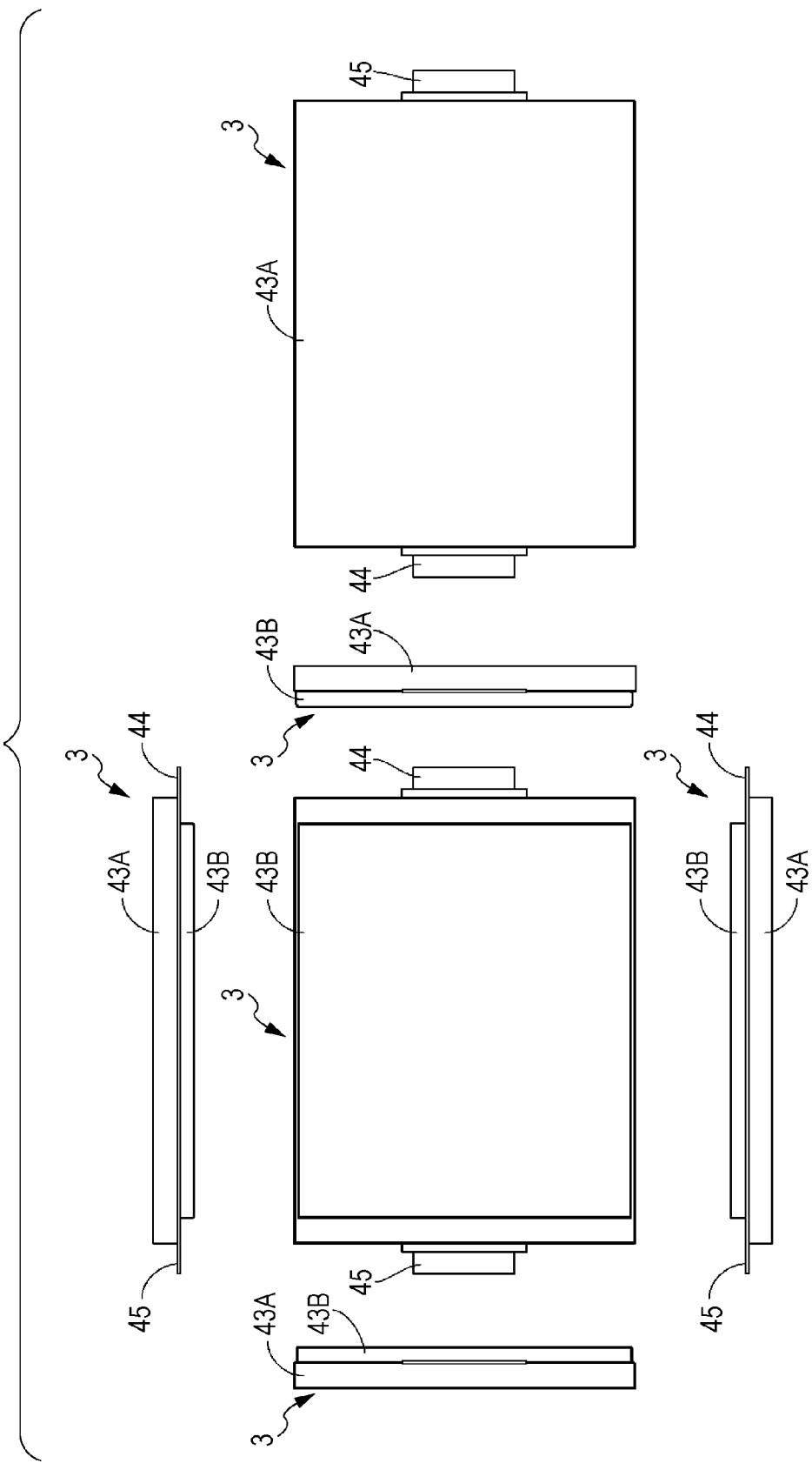

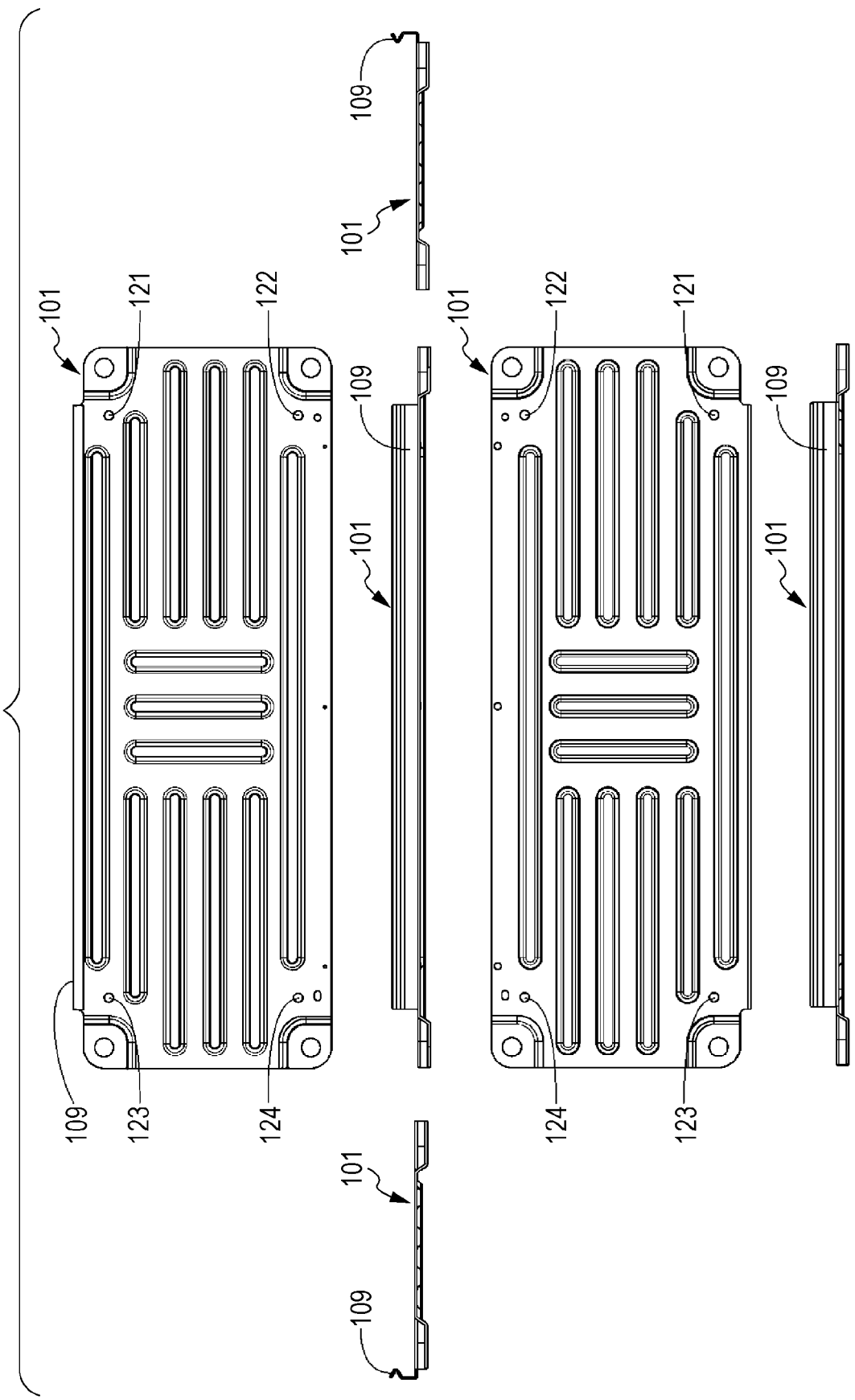

FIG. 22A
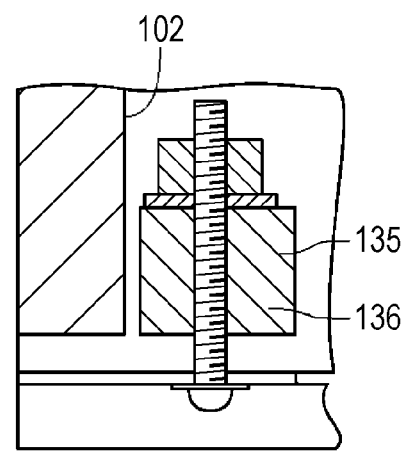
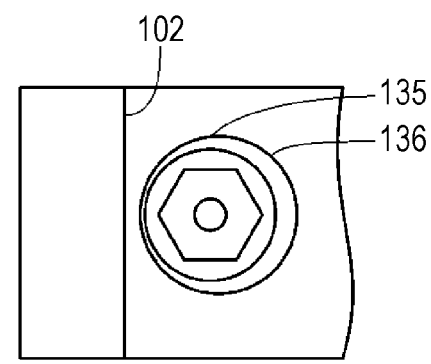
FIG. 22B
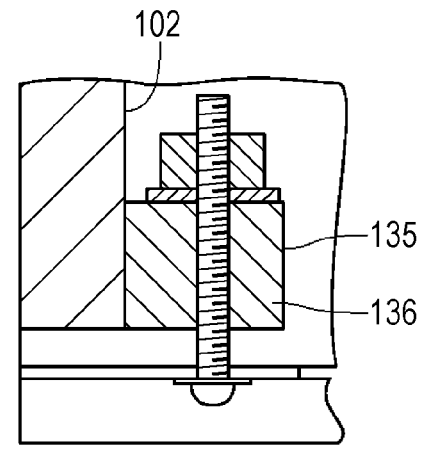
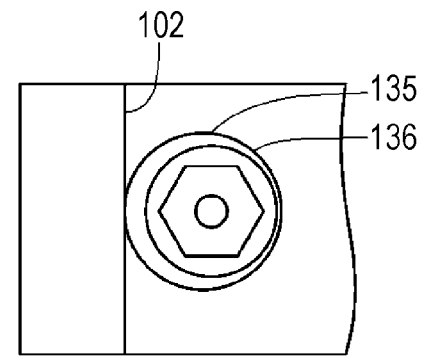

FIG. 26
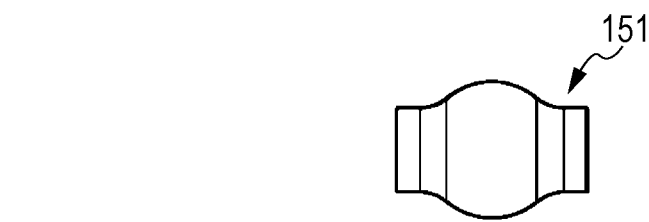
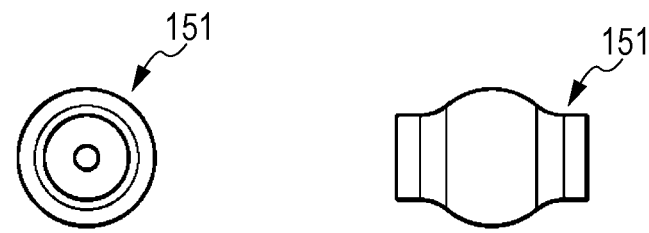

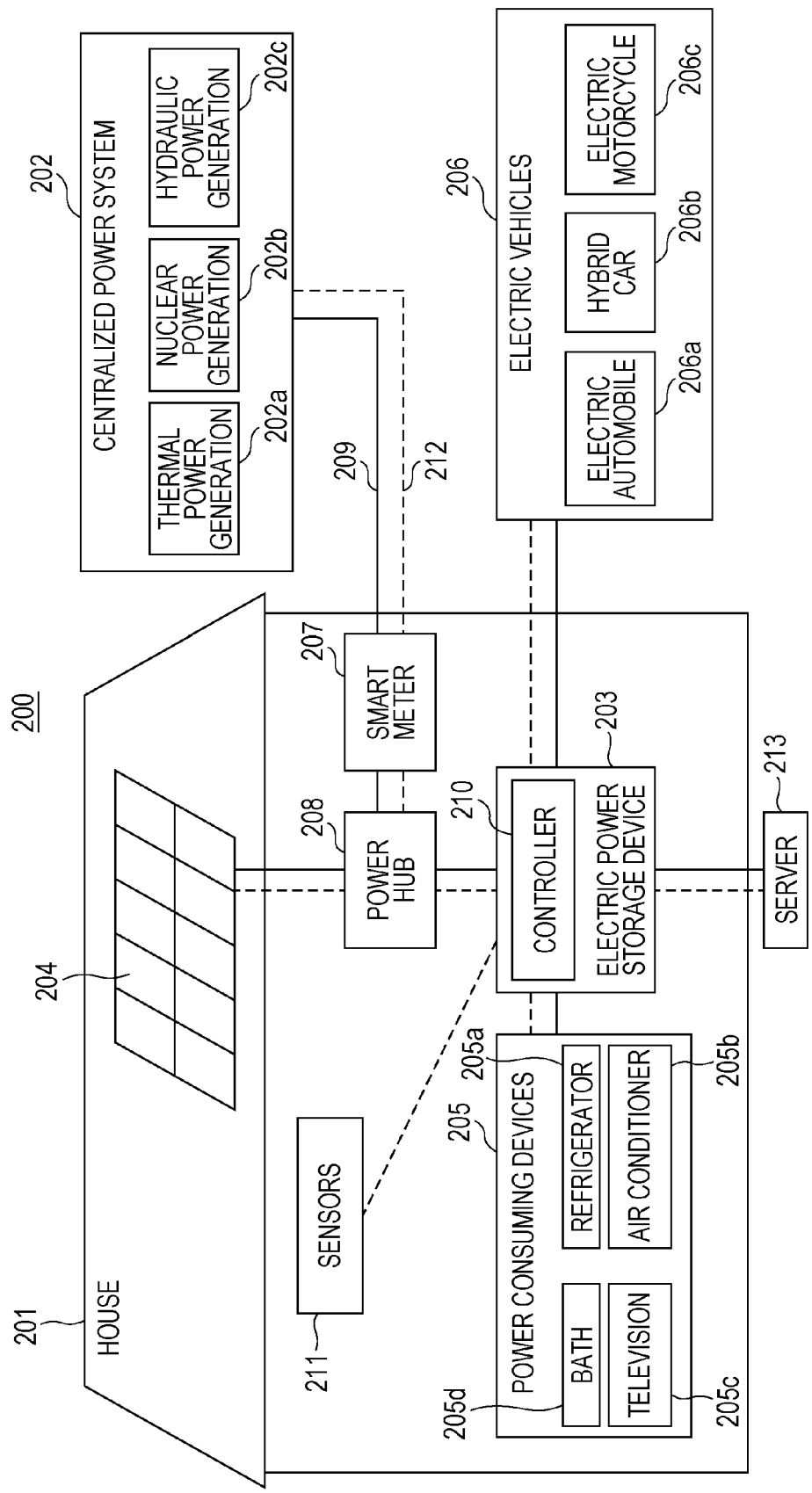

BATTERY MODULE, ELECTRONIC APPARATUS, ELECTRIC POWER STORAGE SYSTEM, ELECTRIC POWER SYSTEM, AND ELECTRIC VEHICLE

CROSS REFERENCES TO RELATED APPLICATIONS

The present application claims priority to Japanese Priority Patent Application JP 2011-129022 filed in the Japan Patent Office on Jun. 9, 2011, the entire content of which is hereby incorporated by reference.

BACKGROUND

The present disclosure relates to a battery module, an electronic apparatus, an electric power storage system, an electric power system, and an electric vehicle.

In related art, lithium-ion secondary batteries using carbon for the anode, a lithium-transition metal composite oxide for the cathode, and a carbonic acid ester compound for the electrolyte are in widespread use. Since carbonic acid ester is stable to oxidation and reduction and can provide higher voltage in comparison to water or other organic solvents, lithium-ion secondary batteries configured in this way exhibit higher energy density and higher capacity than those of nickel-metal hydride batteries that are aqueous batteries. For this reason, lithium-ion secondary batteries are widely used as secondary batteries for electric tools, notebook PCs, portable telephones, camcorders, digital still cameras, and so on.

In recent years, other than the above-mentioned applications, lithium-ion secondary batteries are also growing in popularity for industrial applications such as electric automobile and electric power storage applications. Performance features desired for industrial secondary batteries include high capacity, high output, and long life. One of the performance features that make it possible for a battery to withstand large current is heat dissipation property. A battery generates heat when applied with a large current. It is recognized that an excessive rise in battery temperature hastens degradation of battery performance, and leads to shorter battery life. Accordingly, an important consideration is how to efficiently dissipate heat generated by the battery. Various studies and investigations have been conducted in this regard.

The construction of a battery module in which a number of cells are contained within a case is disadvantageous from the viewpoint of heat dissipation. Accordingly, Japanese Unexamined Patent Application Publication No. 2007-280858 describes a battery module whose cells are not contained within a case.

SUMMARY

However, the above-mentioned construction that does not use a case is disadvantageous from the viewpoint of creating a rigid battery module construction. When used in on-vehicle applications, in particular, the battery module is subject to mechanical vibrations, or used over a wide range of environmental temperatures varying from low to high. It is necessary to ensure that the construction is not prone to rattle under such vibrations. It is also desired to ensure that the construction is not prone to rattle under expansion/contraction of resin components due to temperature variation. Increasing the number of components for a rigid construction is not preferred because of higher cost and the corresponding decrease in volume energy density.

It is desirable to provide a battery module that can be made rigid with excellent heat dissipation property without causing an increase in the number of components, and an electronic apparatus, an electric power storage system, an electric power system, and an electric vehicle that use the battery module.

According to an embodiment of the present disclosure, there is provided a battery module including a plurality of battery supports that each have a face orthogonal to a stacking direction, and a side face, the battery supports each containing a plurality of cells and being made of an insulating material, a coupling part that is located between the face of one of the battery supports and the face of another one of the battery supports adjacent to the one battery support, and contracts in the stacking direction when the battery supports are stacked so as to bring the faces of the battery supports into intimate contact with each other, a group of cells that has the battery supports stacked together with the coupling part being placed between the battery supports, a base plate, and a first regulating plate and a second regulating plate that are placed in a standing position on the base plate so as to face each other, the first and second regulating plates sandwiching the group of cells that is arranged in a space over which the first and second regulating plates face each other, and stacked in a state in which the coupling part is contracted.

Preferably, the coupling part has a projection that is formed in the face of the one battery support, and a depression that is formed at a position of the face of the other battery support corresponding to the projection, the coupling part has a gap defined between a surface of the projection and an inner face of the depression in a state in which the projection and the depression are fitted to each other, and the surface of the projection and the inner face of the depression come into intimate contact with each other when the one battery support and the other battery support are brought into intimate contact with each other.

According to an embodiment of the present disclosure, there is provided an electric power storage system including the battery module mentioned above, and a generator that generates electric power from renewable energy, in which the battery module is charged by the generator.

According to an embodiment of the present disclosure, there is provided an electric power storage system including the battery module mentioned above, and an electronic apparatus connected to the battery module, in which the electric power storage system supplies electric power to the electronic apparatus.

According to an embodiment of the present disclosure, there is provided an electronic apparatus that receives supply of electric power from the battery module mentioned above.

According to an embodiment of the present disclosure, there is provided an electric vehicle including the battery module mentioned above, a converter that receives supply of electric power from the battery module, and converts the electric power into a drive force for the electric vehicle; and a controller that performs information processing related to vehicle control on a basis of information related to the battery module.

According to an embodiment of the present disclosure, there is provided an electric power system including the battery module mentioned above, and an electric power information transmitting and receiving unit that transmits and receives a signal to and from another apparatus via a network, in which the electric power system controls charging and discharging of the battery module on a basis of information received by the electric power information transmitting and receiving unit.

According to an embodiment of the present disclosure, there is provided an electric power system including the battery module mentioned above, a generator, and a power grid, in which the electric power system receives supply of electric power from the battery module, or supplies electric power to the battery module from the generator or the power grid.

According to an embodiment of the present disclosure, the cells are contained within each of the plurality of battery supports, the battery supports are stacked via the expandable coupling part, and the battery supports are placed in the space between the pair of opposing regulating plates in a state in which the expandable coupling part is contracted. Therefore, it is possible to prevent rattle from occurring under vibration, resin expansion/contraction, or the like, and minimize an increase in the number of components.

Additional features and advantages are described herein, and will be apparent from the following Detailed Description and the figures.

BRIEF DESCRIPTION OF THE FIGURES

FIGS. 7A to 7D illustrate a part of a bracket, of which FIGS. 7A and 7B are perspective views and FIGS. 7C and 7D are cross-sectional views;

FIGS. 10A and 10B are a six-sided view and a perspective view, respectively, of a metal holder;

FIG. 14 is a six-sided view illustrating the configuration of a busbar cover;

FIGS. 15A to 15D illustrate an example of a cell according to an embodiment of the present disclosure, of which FIGS. 15A to 15C are perspective views, and FIG. 15D is a partial cross-sectional view of a packaging member;

FIG. 16 is a six-sided view illustrating the configuration of an example of a cell;

FIG. 17 is a six-sided view illustrating the configuration of a base plate;

FIGS. 22A and 22B are schematic diagrams illustrating the function of an eccentric cam;

FIG. 26 is a three-sided view of an elastic member;

FIG. 28 is a schematic diagram illustrating an application example of a battery module.

DETAILED DESCRIPTION

"Schematic Configuration of Battery Module"

Figure 1:
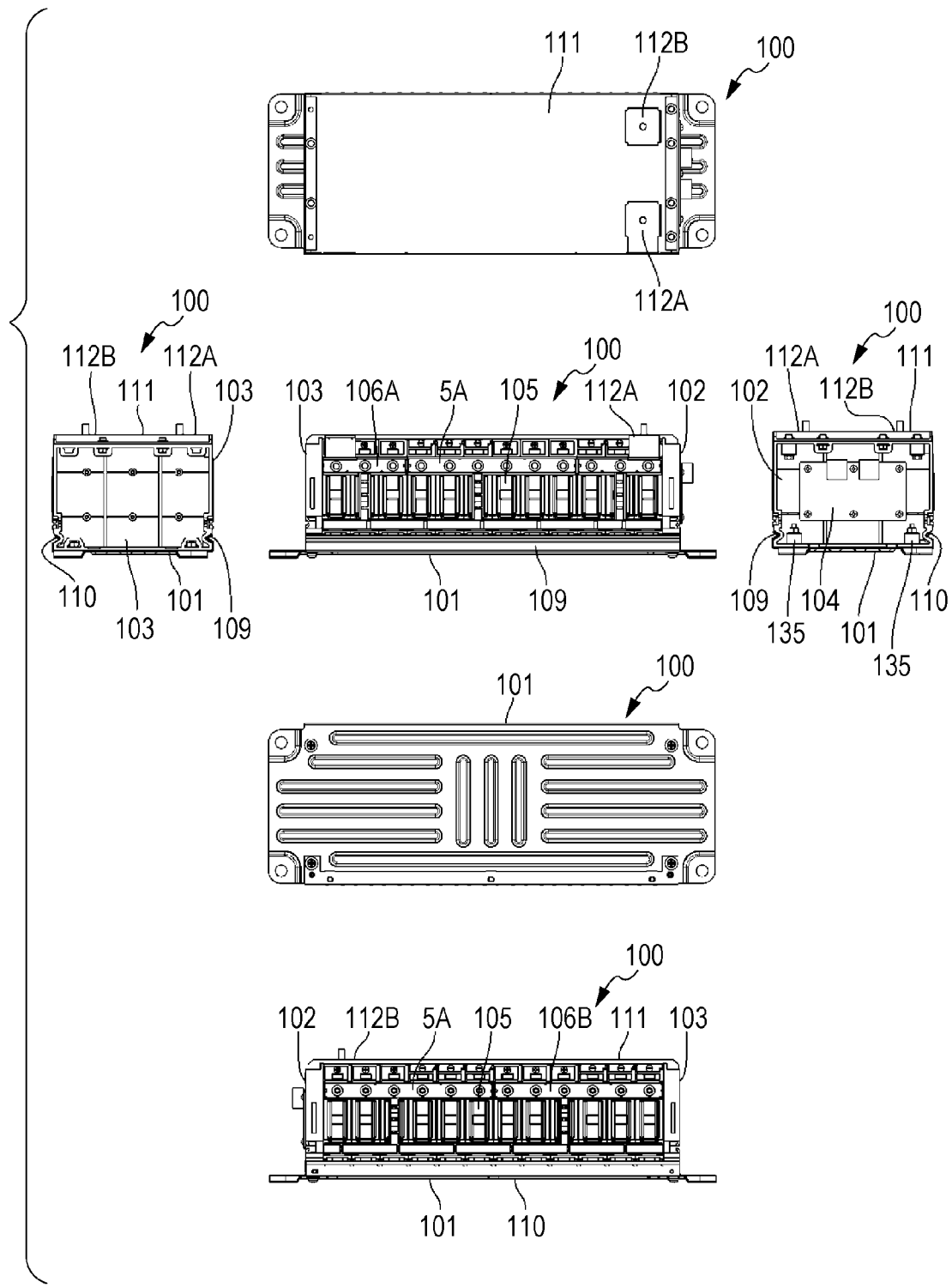
FIG. 1 is a six-sided view illustrating the general configuration of a battery module according to an embodiment of the present disclosure.
Figure 2:
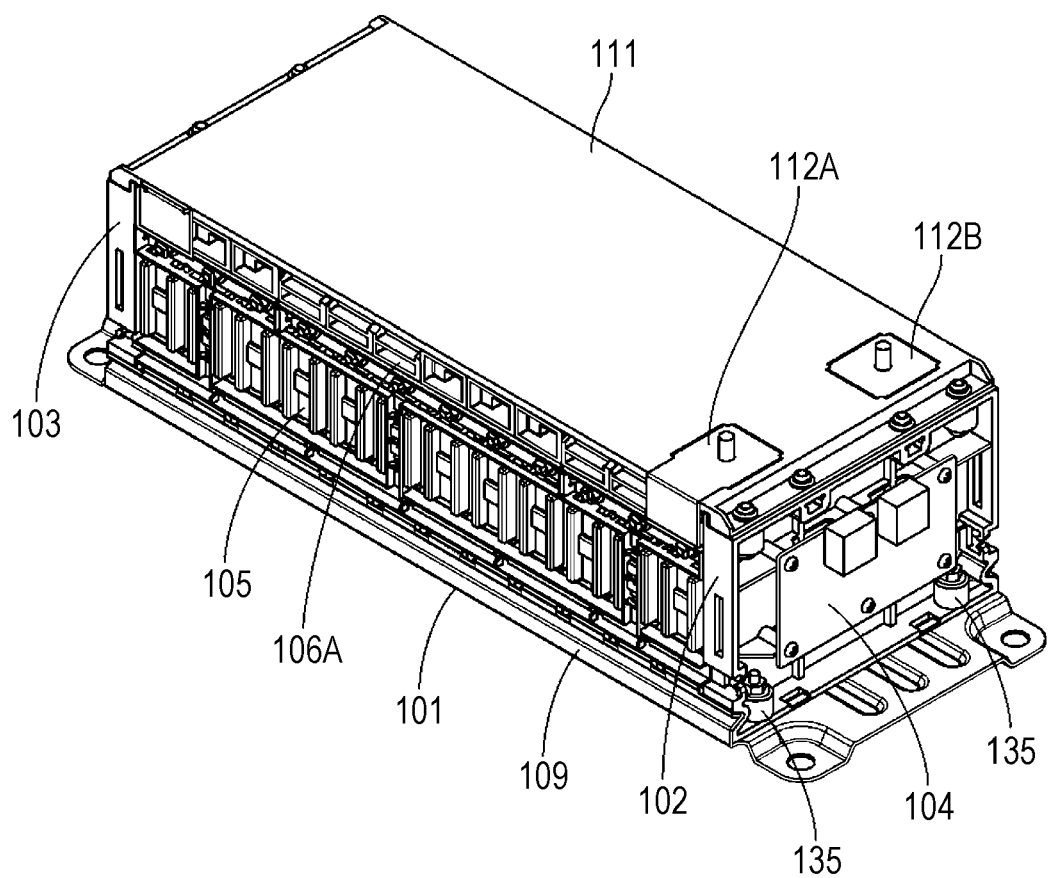
FIG. 2 is a perspective view illustrating the general configuration of a battery module according to an embodiment of the present disclosure.
Figure 3:
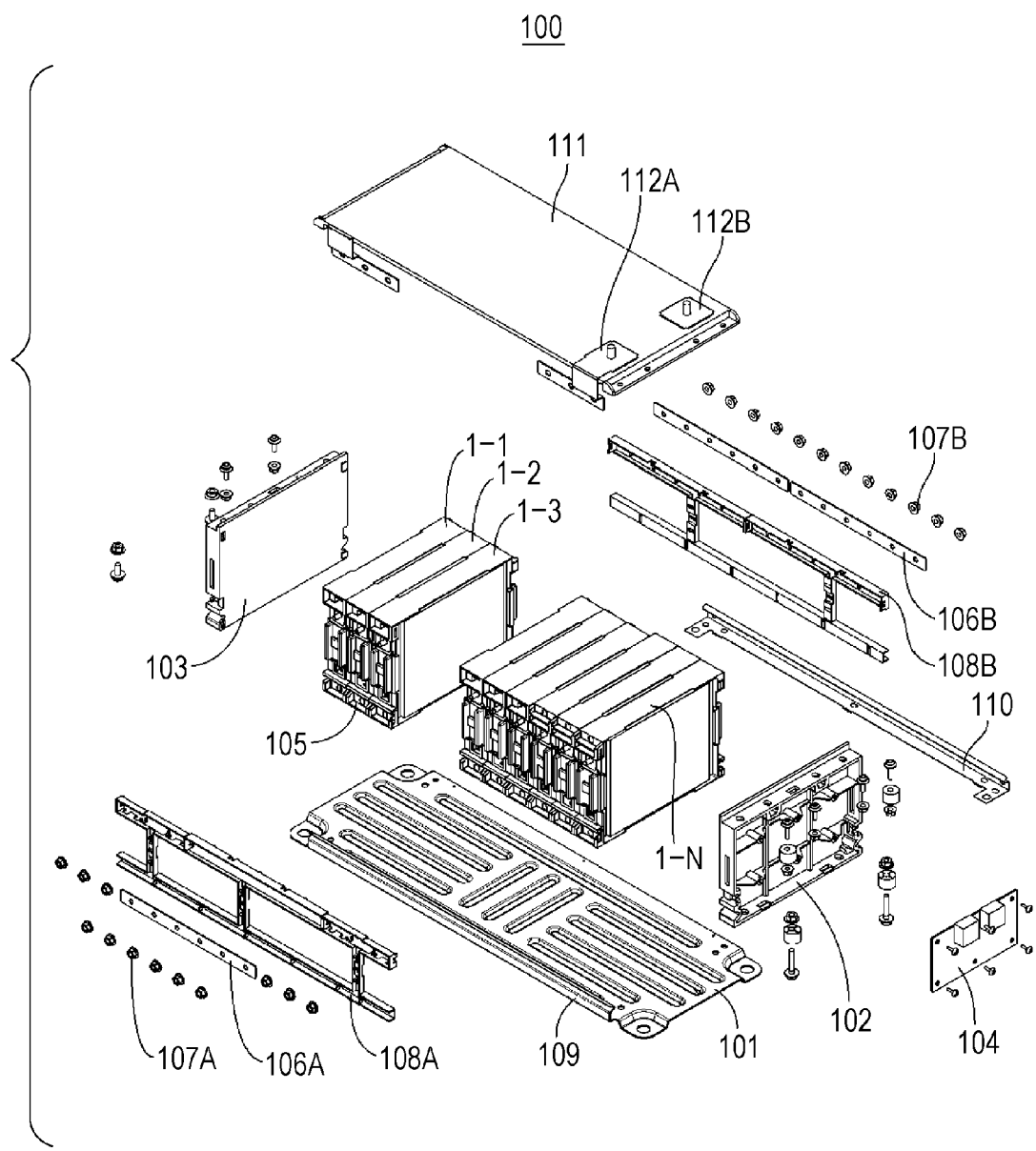
FIG. 3 is an exploded perspective view of a battery module according to an embodiment of the present disclosure.
Figure 4:
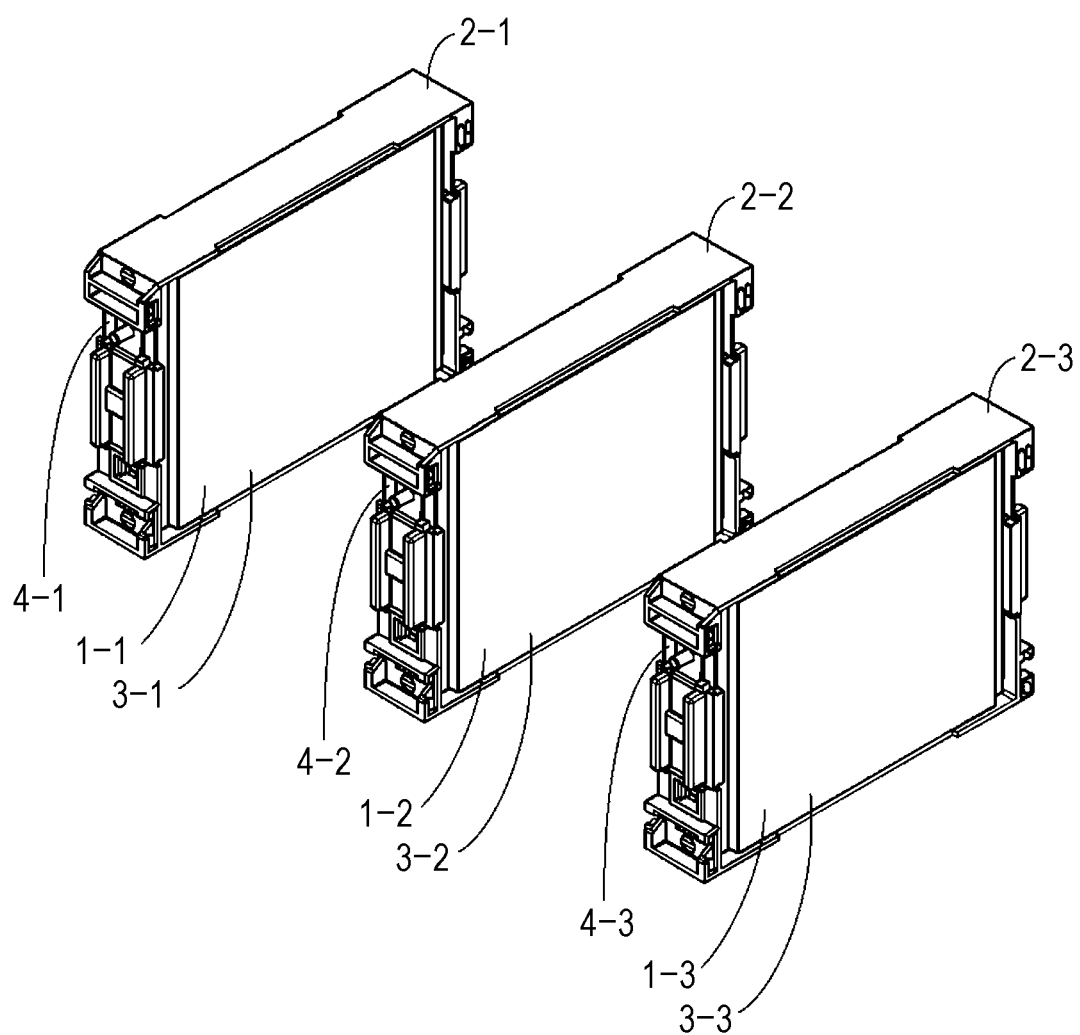
FIG. 4 is a perspective view of battery units.

A battery module according to an embodiment of the present disclosure is described with reference to FIGS. 1 to 3. FIG. 1 is a six-sided view (front, right side, left side, bottom, plan, and rear) of a battery module 100. FIG. 2 is a perspective view of the battery module 100. FIG. 3 is an exploded perspective view of the battery module 100. FIG. 4 is a perspective view of battery units.

The battery module 100 has end plates 102 and 103 as first and second regulating members. The end plates 102 and 103 are placed in a standing position at substantially right angles near the ends of a base plate 101. The base plate 101 is a plate made of metal such as iron. The base plate 101 is provided with a rib for increased strength. A circuit board 104 is fixed to the end plate 102. Circuit elements that make up a circuit for controlling the battery module are mounted on the circuit board 104.

The end plate 102 is movable in the stacking direction with respect to the base plate 101, and the other end plate 103 is fixed to the base plate 101. For example, the end plate 102 is displaced closer to the end plate 103 by an eccentric cam 135. The end plates 102 and 103 are provided in parallel to each other. A cell group 105 is inserted in the space over which the end plates 102 and 103 face each other. As the end plate 102 is displaced closer to the end plate 103, the force with which the group of cells 105 is squeezed between the end plates 102 and 103 increases, thereby rigidly holding the group of cells 105 together.

The group of cells 105 is obtained by stacking N battery supports (hereinafter, referred to as brackets) each containing multiple cells. For example, two cells are contained within each bracket. For example, each cell is a lithium-ion secondary cell. A construction including a plurality of cells contained within a bracket is referred to as battery unit. Each bracket a synthetic resin molded component.

For example, three stacked battery units 1-1, 1-2, and 1-3 are depicted as being separated from one another in FIG. 4. Each of the battery units has a bracket 2-1, 2-2, 2-3. In cases where it is not necessary to distinguish each individual battery unit from the others, the corresponding battery unit is referred to as "battery unit 1". In cases where it is not necessary to distinguish each individual bracket from the others, the corresponding bracket is referred to as "bracket 2".

The bracket 2 is made of an insulating material (synthetic resin). The bracket 2 is in a frame-like shape whose top, bottom, and both side faces are connected and which has a face substantially orthogonal to the stacking direction. The bracket 2 contains, for example, two cells. The bracket 2 has an opening formed in its face that faces the bracket of the adjacent battery unit when the brackets 2 are stacked together. The principal face of a cell 3-1, 3-2, 3-3 contained within the bracket 2 is exposed through this opening. In cases where it is not necessary to distinguish each individual cell from the others, the corresponding cell is referred to as "cell 3". The cell 3 is in a plate-like shape or a rectangular parallelepiped. Of the surfaces of the cell 3, the face with the largest surface area is referred to as principal face.

For example, in the case of the group of cells 105 having N=12 stacked battery units, 24 cells make up the battery module 100. For example, in the battery unit 1, two cells are connected in parallel. This connection is referred to as 2P. When two battery units 1 are connected in parallel, this connection is referred to as 4P. When 6 sets of cells in 4P configuration are connected in series, the resulting battery module 100 has a 4P6S connection. The specific configuration of connection to use is determined by taking into account the output voltage, output current, capacity, and so on necessary for each individual 2P battery unit.

For the 2P connection in the battery unit 1, a first plate-like conductive member (hereinafter, referred to as cell busbars) 4-1, 4-2, 4-3 is used. The cell busbar is, for example, a conductor having copper plated with nickel and shaped into a plate-like form. In cases where it is not necessary to distinguish each individual cell busbar from the others, the corresponding cell busbar is simply referred to as cell busbar 4. The cell busbar 4 is attached to either side face of the bracket 2 of each of the battery units 1.

Further, to establish connection between the battery units 1, a second plate-like conductive member (hereinafter, referred to as unit busbar) 106A, 106B made of copper, aluminum, or the like, for example, is used. The unit busbar 106A, 106B is attached over multiple battery units 1 so as to establish connection between desired battery units 1.

A hexagon head bolt projecting from a side face of each battery unit is passed through each of holes formed in the unit busbar 106A, 106B, and is fastened with a nut 107A, 107B. In this case, the unit busbar 106A, 106B is attached in advance into a window formed in a busbar cover 108A, 108B made of synthetic resin. The busbar cover 108A, 108B serves as an insulation and attachment guide for the unit busbar 106A, 106B.

The group of cells 105 connected in a desired configuration by the unit busbar 106A, 106B is attached onto a base plate 101. A retention part 109 is provided along one end face of the base plate 101 which extends in the stacking direction. A depression provided in each bracket of each battery unit in the group of cells 105, and the retention part 109 are fitted to each other, thereby effecting positioning of the group of cells 105.

A plate spring (referred to as spring plate) 110 is attached to the other end face of the base plate 101 which extends in the stacking direction. The spring plate 110 elastically fits in the depression provided in each bracket. The spring force of the spring plate 110 produces a force that acts to fix the group of cells 105 onto the base plate 101.

After the group of cells 105 is fixed to the base plate 101, a top plate 111 is attached so as to be placed across between the end plates 102 and 103. The top plate 111 is provided with terminals 112A and 112B for drawing electric power to the outside.

The major components of the battery module 100 as mentioned above are described below.

"Bracket"

Figure 5:
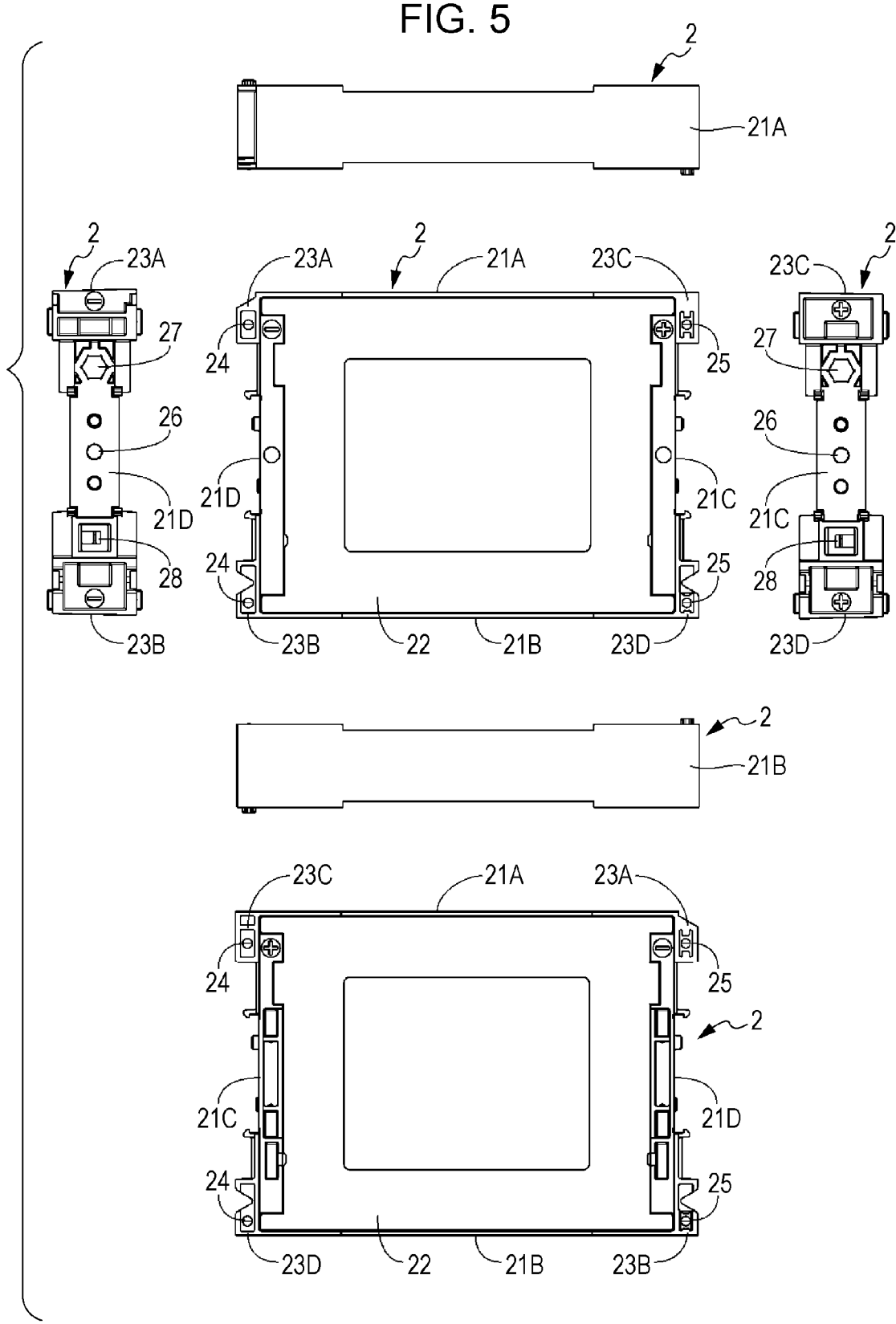
FIG. 5 is a six-sided view illustrating the configuration of a bracket.
Figure 6:
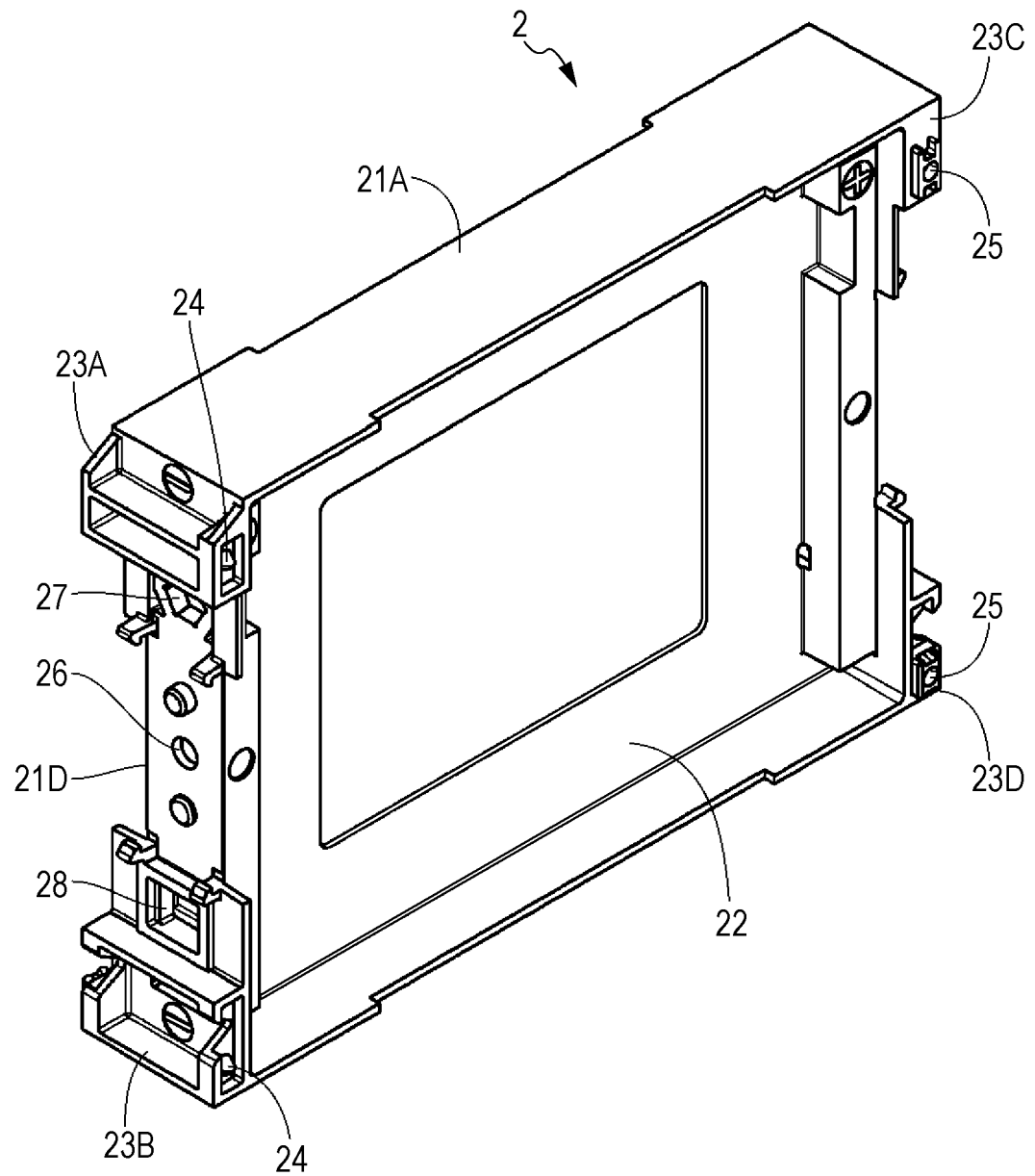
FIG. 6 is a perspective view of a bracket.

FIG. 5 is a six-sided view of the bracket 2. FIG. 6 is a perspective view of the bracket 2. The bracket 2 has side faces (a top face 21A, an under face 21B, a side face 21C, and a side face 21D) that extend in the stacking direction of the battery unit 1. A marking indicating the positive or negative polarity of the battery unit is impressed at each of upper and lower positions on the side faces of the bracket 2, and on each of the front and back faces of the bracket 2. By rotating the battery unit 1, the polarities of adjacent battery units can be made the same or opposite.

The middle section of each of the top face 21A and the under face 21B is narrowed by being cut away inwardly from the end face. As a result, upon stacking the brackets 2, for example, a slit with a width of 1 mm is formed, through which a coolant (cooling air) flows into the bracket 2 to cool the cells 3 inside the bracket 2.

For applications such as vehicles in which high output, high capacity batteries are necessary, energy density per volume is an important consideration. On the other hand, to cool the group of cells 105, a structure that allows passage of the coolant is necessary, and such a structure becomes a factor that increases volume. Owing to the gap secured between the largest surface areas (principal faces) of the cells, the configuration according to an embodiment of the present disclosure can adapt to movement of the coolant from the top face to the bottom face, from the bottom face to the top face, or from one side face to the opposite side face of the battery module, in accordance with the cooling system. This configuration can minimize an increase in volume.

A spacer 22 is provided orthogonally to the stacking direction inside the frame-like bracket 2. The spacer 22 lies between the principal faces of two cells that are contained within the bracket 2 with their principal faces facing each other.

Coupling parts 23A to 23D are provided at the four respective corners of the bracket 2. The coupling parts 23A to 23D are formed in order to couple adjacent battery units 1 together when stacking the battery units 1. As also illustrated in FIG. 6 and FIGS. 7A to 7D, a conical projection 24, and a depression 25 that conforms to the shape of the conical projection 24 so as to fit the projection 24 are provided as each of the coupling parts. The area around the conical projection 24 is formed as a rectangular cutout, defining a raised area around the depression 25, and the projection is fitted inside the cutout, thereby facilitating positioning.

The coupling parts 23A to 23D are configured so that the conical projection 24 and the depression 25 face each other irrespective of whether the battery units are oriented in such a way that the polarities of adjacent battery units are the same or are opposite. A notch with a V-shaped cross-section is provided in each of the coupling parts 23B and 23D located in close proximity to the under face 21B. The retention part 109 or spring plate 110 of the base plate 101 fits into the notch. Further, one of the coupling parts at the corners is different in shape from the other coupling parts. For example, an edge of the coupling part 23A is cut away obliquely. This is to identify the orientation of the battery unit 1.

Figure 7A:
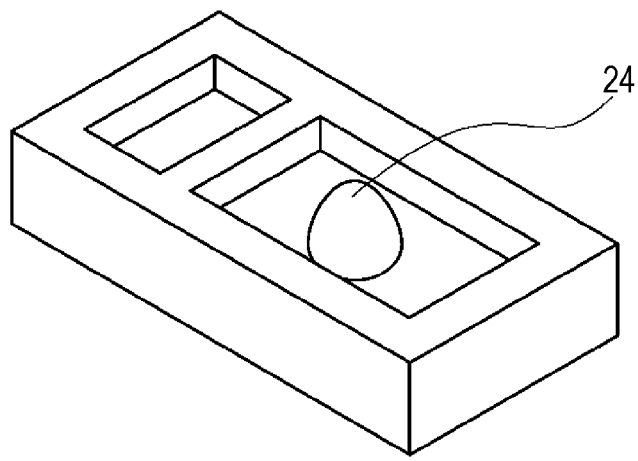
Figure 7B:
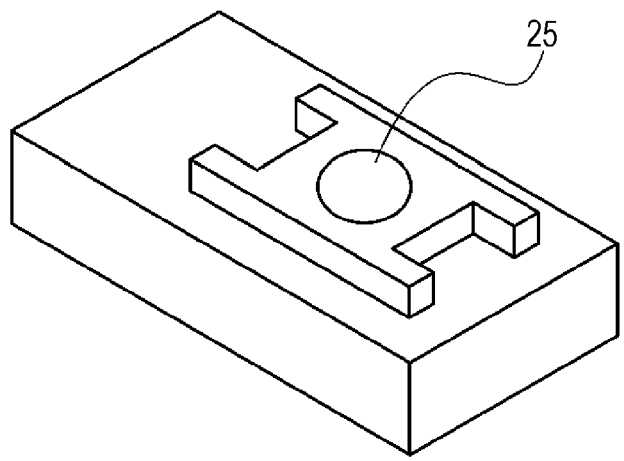
Figure 7C:
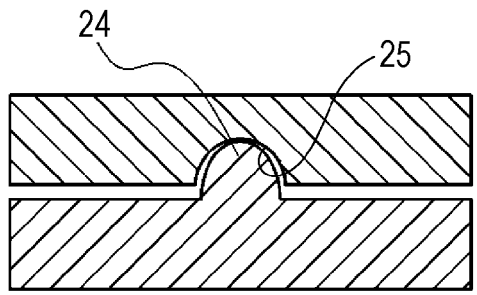
Figure 7D:
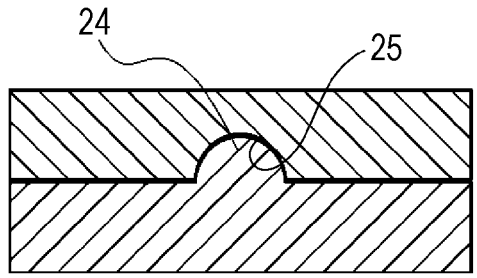

In the state in which two battery units 1 are stacked as illustrated in FIG. 7C, the conical projection 24 and depression 25 of the coupling part fit to each other. In this state, the surface of the conical projection 24 and the inner face of the depression 25 make a point contact or contact each other over a small area, with a minute space defined between the two faces. Then, when pressure is applied in the stacking direction, as illustrated in FIG. 7D, the inner face of the depression 25 is spread out, and the surface of the conical projection 24 and the inner face of the depression 25 come into surface contact with each other, thereby firmly coupling the two battery units 1 together without rattling. The projection provided may not necessarily be conical but may have a spherical shape or the like.

For applications such as vehicles in which high output, high capacity batteries are necessary, it is necessary to connect multiple battery units in series or parallel efficiently. In this case, the battery units are sometimes assembled together with application of preload to the whole battery pack by using a spring or elastomer. However, in such cases, creep of multiple components has to be considered, making it difficult to couple multiple battery units together. As mentioned above, according to an embodiment of the present disclosure, the bracket 2 is provided with a shape that serves as a substitute for a spring, thereby making it possible to construct a rattle-free battery module without considering contraction/expansion or creep due to temperature variation of multiple components.

The cell busbar for electrically connecting the cells inside the bracket is attached to each of the side faces 21C and 21D of the bracket 2. The side face 21C, 21D is provided with a hole 26. A screw for screwing the cell busbar into place passes through the hole 26. A positioning protrusion is formed above and below the hole 26. Further, a receiving part 27 is formed in the side face 21C, 21D. The receiving part 27 receives the head portion of the hexagon head bolt to stop rotation of the hexagon head bolt.

The battery unit is provided with a temperature detecting element for detecting the temperature of the cells inside the battery unit. A cutout 28 running to the inside of the bracket 2 is formed in each of the side faces 21C and 21D of the bracket 2. A temperature detecting member (hereinafter referred to as thermistor cap) having the temperature detecting element, for example, a thermistor provided on one face is fitted into the cutout 28.

"Battery Unit"

Figure 8:
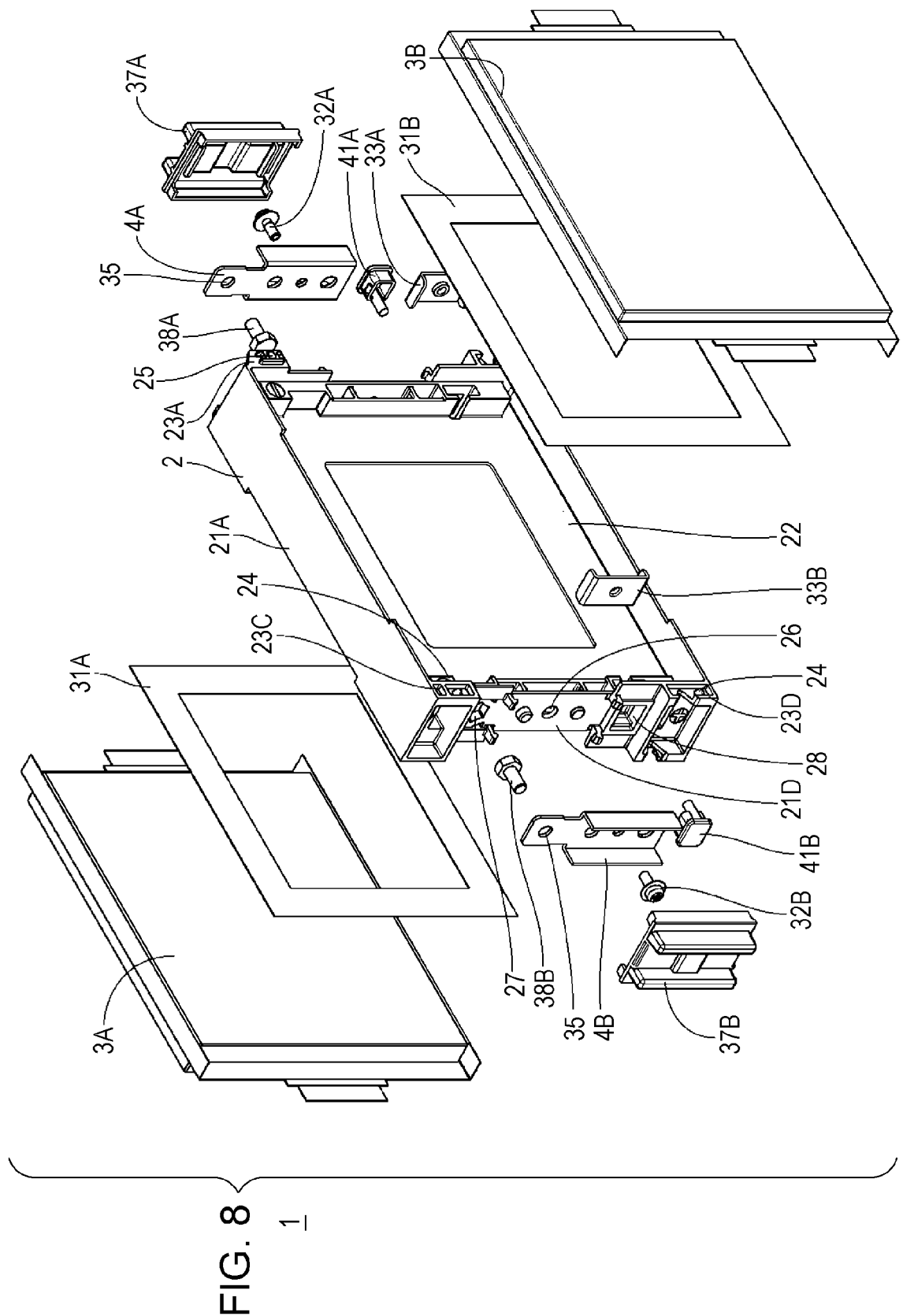
FIG. 8 is an exploded perspective view of a battery unit.

FIG. 8 is an exploded perspective view of the battery unit 1. Cells 3A and 3B are contained within the bracket 2 mentioned above. The principal face of the cell 3A is fixed to one face of the spacer 22 of the bracket 2 via a double-sided adhesive tape 31A with favorable thermal conduction characteristics. The principal face of the cell 3B is fixed to the other face of the spacer 22 of the bracket 2 via a double-sided adhesive tape 31B. Like the spacer 22, the double-side adhesive tape 31A, 31B has an opening at the center. The double-side adhesive tape 31A, 31B fixes the cell 3A, 3B into place, and also functions as a heat transfer sheet.

A cell busbar 4A is attached to the side face 21C of the bracket 2 by a screw 32A and a metal holder 33A. A cell busbar 4B is attached to the side face 21D of the bracket 2 by a screw 32B and a metal holder 33B. In cases where it is not particularly necessary to distinguish each one of the cell busbars 4A and 4B from the other, the corresponding cell busbar is referred to as cell busbar 4. In cases where it is not particularly necessary to distinguish each one of the metal holders 33A and 33B from the other, the corresponding metal holder is referred to as metal holder 33.

Figure 9A:
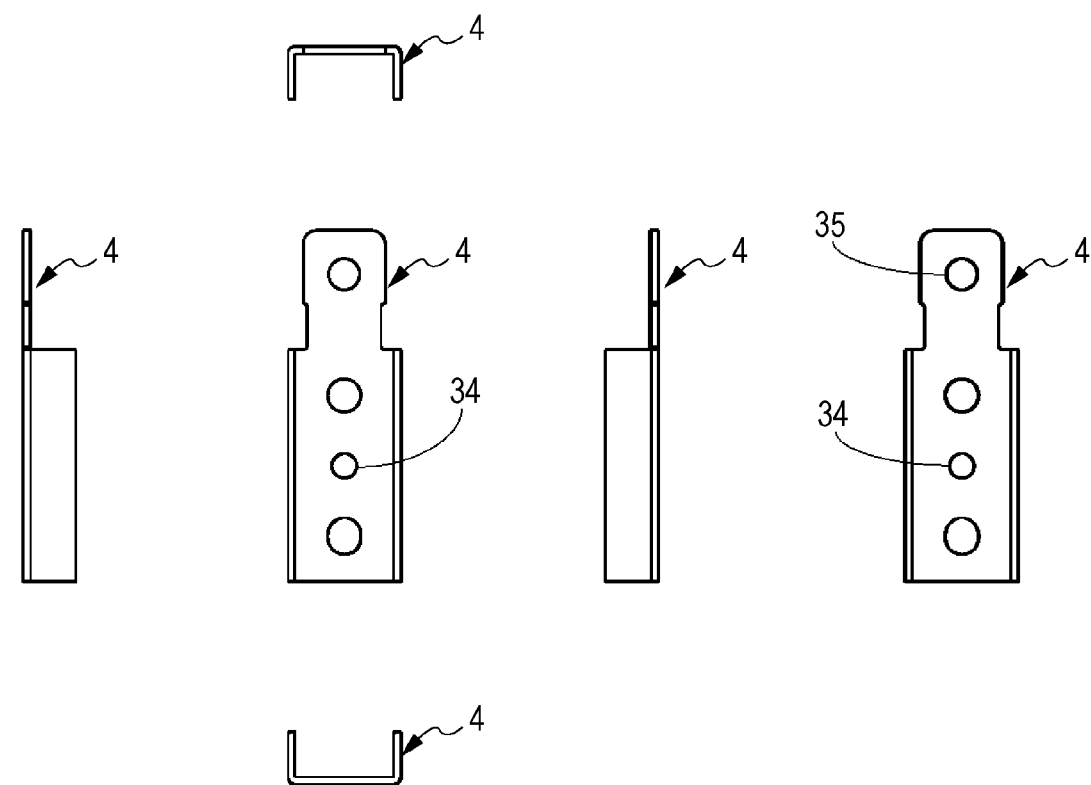
FIGS. 9A and 9B are a six-sided view and a perspective view, respectively, of a cell busbar.
Figure 9B:
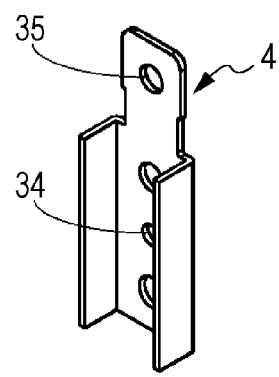

FIGS. 9A and 9B are a six-sided view and a perspective view, respectively, of the cell busbar 4. FIGS. 10A and 10B are a six-sided view and a perspective view, respectively, of the metal holder 33. The cell busbar 4 is prepared by bending a plate-like metal conductor. The cell busbar 4 is generally strip-shaped, and has a hole 34 for attaching the cell busbar 4 to the bracket 2. A positioning hole is provided above and below the hole 34. The both sides of the hole 34 are bent at substantially right angles, forming parallel bent parts. A hole 35 for attaching the unit busbar is formed at the end where the bent parts are not formed.

As illustrated in FIGS. 10A and 10B, the metal holder 33 is prepared by bending a plate-like metal conductor. The metal holder 33 has a screw hole 36 at substantially the central position, with a leg provided at either end. As illustrated in FIG. 8, the metal holder 33A, 33B is placed in the space defined inside the side face 21C, 21D of the bracket 2 made of resin. Then, the screw 32A, 32B is passed through the hole 34 in the cell busbar 4A, 4B and the hole 26 in the bracket, and is screwed into place by the screw hole 36 of the metal holder 33A, 33B.

In the case of fixing a cell battery to the bracket that is a resin component, normally, the female thread necessary for fixing and fastening the cell busbar onto the bracket is insert-molded. However, use of such insert-molding leads to stress rupture due to resin creep at elevated temperatures. Further, the cell busbar uses copper or aluminum and thus has a weak material strength, so the insert can become dislodged by the rotational torque exerted during fastening.

According to an embodiment of the present disclosure, the metal holder 33 with a female thread is placed in the depression of the bracket 2, and fastened with a screw together with the cell busbar 4. While the metal holder 33 attempts to rotate with the rotational torque, the metal holder 33 is held by the depressed part, and the female thread thus does not rupture or become dislodged. Further, the risk of rupture due to resin creep can be reduced because the female thread is not inserted in the resin part in advance as is the case with an insert nut.

The lead electrodes (hereinafter referred to as cathode tabs and anode tabs) of the cells 3A and 3B are joined to the respective bent parts of the cell busbars 4A and 4B. For example, the cathode tabs of the cells 3A and 3B are jointed to the cell busbar 4A by welding, and the anode tabs of the cells 3A and 3B are jointed to the cell busbar 4B by welding. Various methods such as laser welding can be used as the welding method.

Protective covers 37A and 37B molded from resin are attached to the cell busbars 4A and 4B which have been attached to the bracket 2 and to which the cathode and anode tabs of the cells have been joined, respectively. The protective covers 37A and 37B are so shaped as to cover the area between the respective bent parts of the cell busbars 4A and 4B. The protective covers 37A and 37B are provided from the viewpoint of securing the insulation distance for safety.

Hexagon head bolts 38A and 38B that pass through the hole 35 in the cell busbars 4A and 4B are provided. As mentioned above, the receiving part 27 for receiving the head portion of the hexagon head bolt 38A, 38B is formed in the side face 21C, 21D of the bracket 2. The head portion of the hexagon head bolt 38A, 38B is placed in the receiving part 27, and the bolt portion passes through the hole 35 in the cell busbar 4A, 4B and projects to the outside from the cell busbar 4A, 4B. The unit busbar 106A, 106B is attached to the projecting bolt portion of the hexagon head bolt 38A, 38B by the nut 107A, 107B and the busbar cover 108A, 108B (see FIG. 3).

Figure 11A:
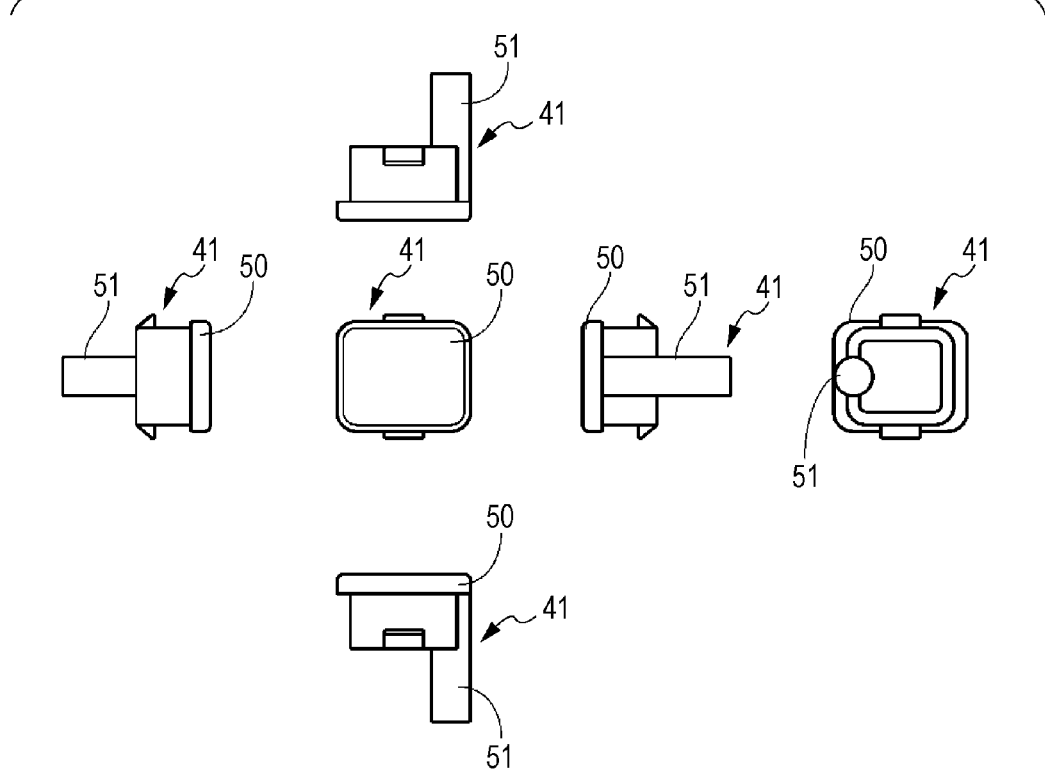
FIGS. 11A and 11B are a six-sided view and a perspective view, respectively, of a thermistor cap.
Figure 11B:
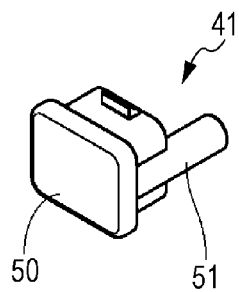

Thermistor caps 41A and 41B are fitted into the cutout 28 formed in the side faces 21C and 21D of the bracket 2, respectively. In cases where it is not particularly necessary to distinguish each one of the thermistor caps 41A and 41B from the other, the corresponding thermistor cap is referred to as thermistor cap 41. FIGS. 11A and 11B are a six-sided view and a perspective view, respectively, of the thermistor cap 41.

The thermistor cap 41 has a plate-like base 50 that covers the cutout 28, and a thermistor 51 provided substantially orthogonally to the base 50. An anti-detachment claw is formed in the block on the back face of the base 50. The base 50 is a conductor portion electrically connected to the thermistor 51. A lead wire for electrical connection of the thermistor 51 is soldered to the base 50.

In the configuration according to an embodiment of the present disclosure, the thermistor 51 can be attached to the end face of the cell located near the cell electrode that is an important temperature measurement point. By incorporating the thermistor 51 into a cap structure, it is possible to improve ease of manufacture and prevent instruction of foreign matter. Further, the additional advantages include effective utilization of the dead space of the battery unit, with no increase in the outside dimensions of the battery unit.

"Unit Busbar"

Figure 12:
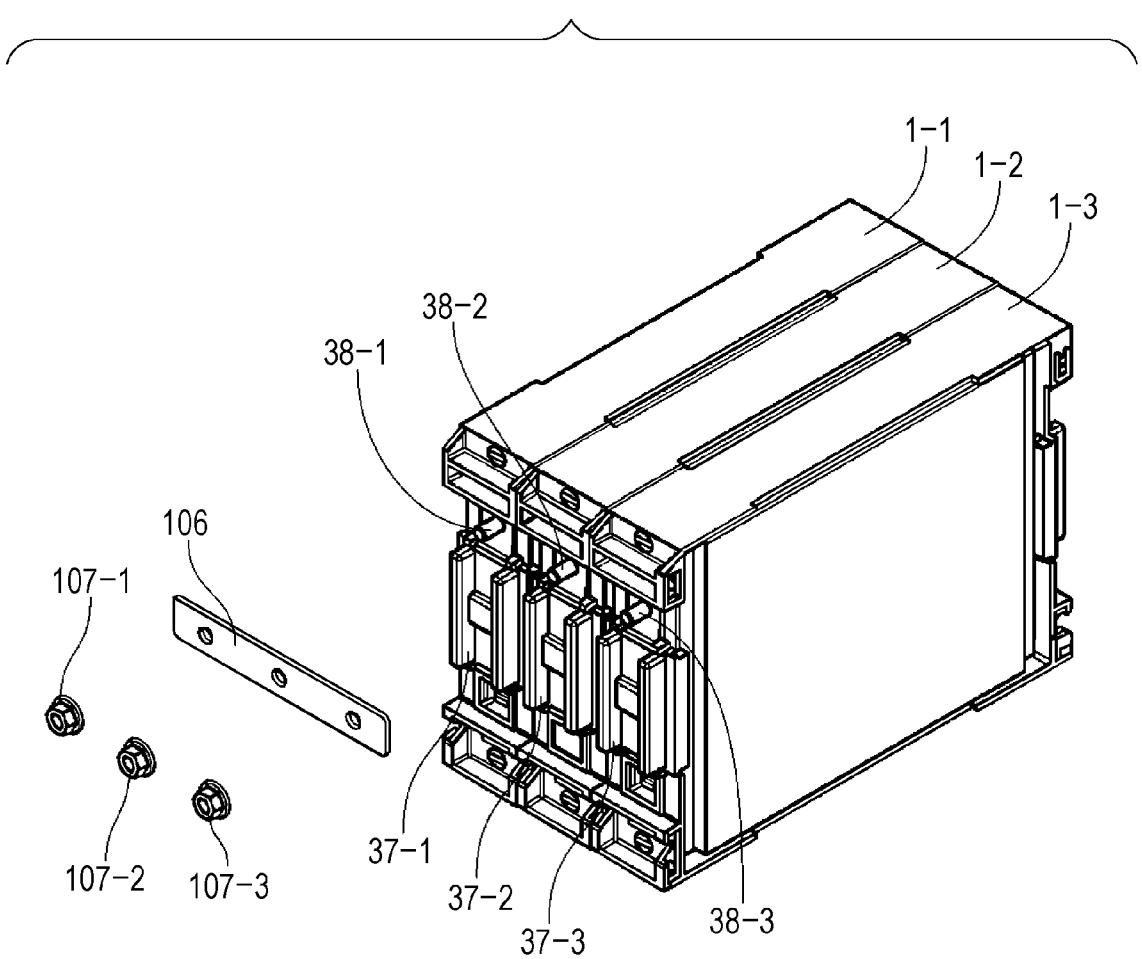
FIG. 12 is an exploded perspective view illustrating how to attach a unit busbar.

As illustrated in FIG. 12, the hexagon head bolts 38-1, 38-2, and 38-3 project from the corresponding ones of adjacent battery units. These projecting bolt portions each pass through a hole formed in the unit busbar 106 (the unit busbars 106A and 106B are collectively referred to as unit busbar 106). Then, by inserting nuts 107-1, 107-2, and 107-3 from the distal end, and fastening the nuts 107-1, 107-2, and 107-3, the unit busbar 106 is attached so as to be electrically connected to the cell busbar of each of the battery units. In FIG. 12, the busbar cover is not illustrated for simplicity.

Figure 13:
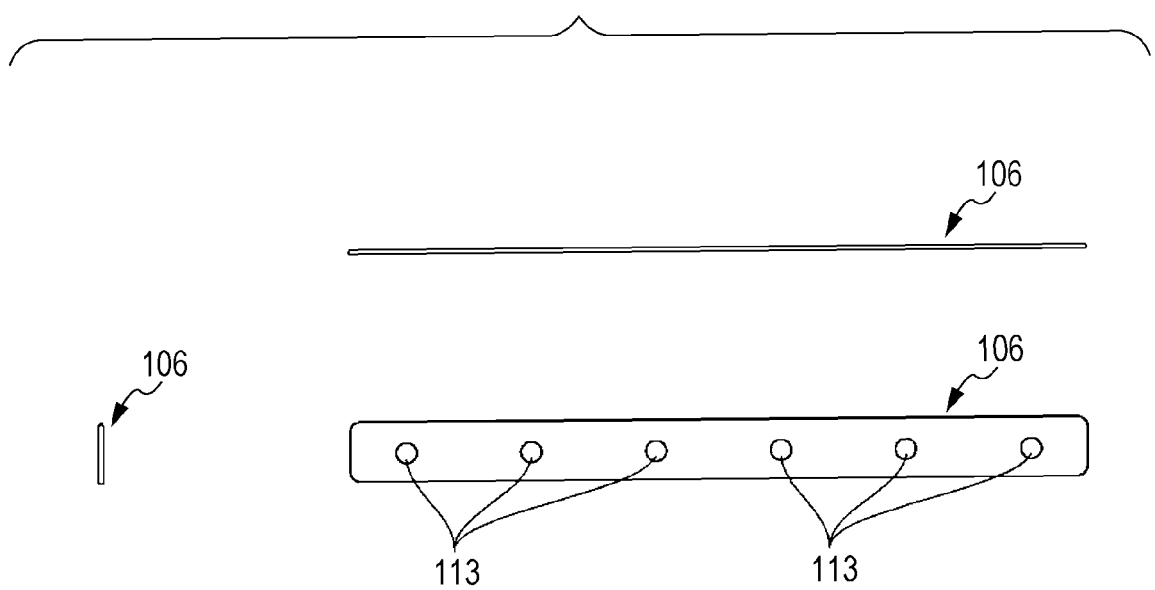
FIG. 13 is a three-sided view illustrating a unit busbar.

As illustrated in a three-sided view (front, side, and plan) of FIG. 13, the unit busbar 106 is a strip-shaped electrode plate made of metal such as copper or aluminum. As mentioned above, the unit busbar 106 has holes 113 through each of which the bolt portion of the hexagon head bolt passes. The length of the unit busbar 106 is determined in accordance with the number of battery units to be connected together. The length of the unit busbar 106 illustrated in FIG. 13 is set so that, for example, electrodes on one side of six battery units are connected together.

In the case of connecting the cell busbars of multiple battery units, a male stud is formed in each of the cell busbars by caulking, followed by fastening with a nut. However, there is a possibility that the caulked part may rupture owing to the rotational torque exerted during fastening. Also, since the bracket made of resin expands and contracts with temperature, stress is applied to the male stud, causing rupture of the caulked part.

According to an embodiment of the present disclosure, the bracket 2 is provided with the receiving part 27, the head of the hexagon head bolt 38 is placed in the receiving part 27, and then the unit busbar 106 is covered from above, followed by fastening with the nut 107. While the hexagon head bolt 38 attempts to rotate with the rotational torque, the hexagon head bolt 38 is held by the receiving part 27, and is in a floating state completely separated from the cell busbar 4. Thus, the cell busbar 4 does not rupture owing to the rotational torque exerted during fastening. As for thermal contraction of the bracket 2 as well, no rupture occurs because stress does not concentrate on the caulked part as in the case of caulking.

"Busbar Cover"

FIG. 14 is a six-sided view of the busbar cover 108A. Although the busbar cover 108A is described below, the other busbar cover 108B is of the same configuration as the busbar cover 108A. The busbar cover 108A is a resin molded component. The busbar cover 108A has a busbar attaching part 115, a base 116, and supporting parts 117A, 117B, and 117C. The busbar attaching part 115 has a length substantially equal to the full length of the group of cells 105. The base 116 is parallel to the busbar attaching part 115. The supporting parts 117A, 117B, and 117C are placed across between the busbar attaching part 115 and the base 116.

The busbar cover 108A is attached to the side face of the group of cells 105. The busbar attaching part 115 of the busbar cover 108A is attached to a position corresponding to the attaching position of the unit busbar 106A of the group of cells 105. The base 116 is located in the lower part of the side face of the group of cells 105. A busbar attaching window 118 is formed in the busbar attaching part 115. The unit busbar can be contained in the busbar attaching window 118. That is, the length and width of the busbar attaching window 118 are substantially equal to those of the unit busbar 106A.

To attach the unit busbar 106A to the group of cells 105, the unit busbar 106A is placed within the busbar attaching window 118 of the busbar cover 108A in advance. Then, as mentioned above, the unit busbar 106A is fixed to the group of cells 105. Likewise, the unit busbar 106B is placed within the busbar attaching window 118 of the busbar cover 108B in advance, and is fixed to the group of cells 105.

When attaching the unit busbar 106A, 106B to the group of cells 105, particularly when connecting multiple unit busbars, a short-circuit can occur between electrodes owing to erroneous installation by the operating personnel, which poses a danger. According to an embodiment of the present disclosure, installation is performed in the state with the unit busbar 106A, 106B previously attached to the busbar cover 108A, 108B, thereby preventing a short-circuit between electrodes due to installation error. The unit busbar 106A, 106B may be attached after installation of the busbar cover 108A, 108B.

"Configuration of Secondary Cell"

Figure 15A:
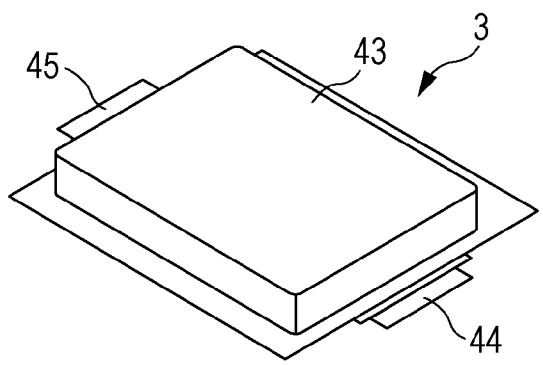
Figure 15B:
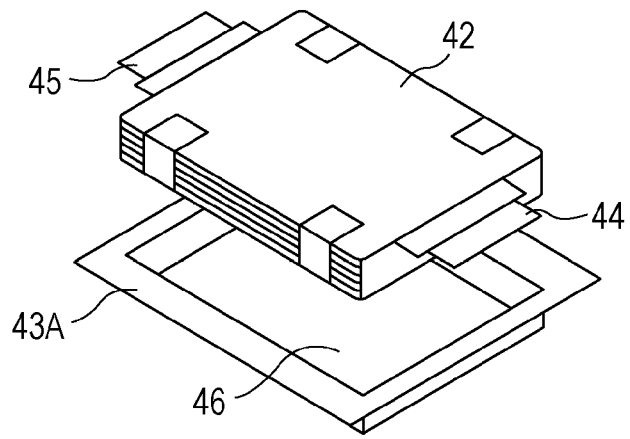
Figure 15C:
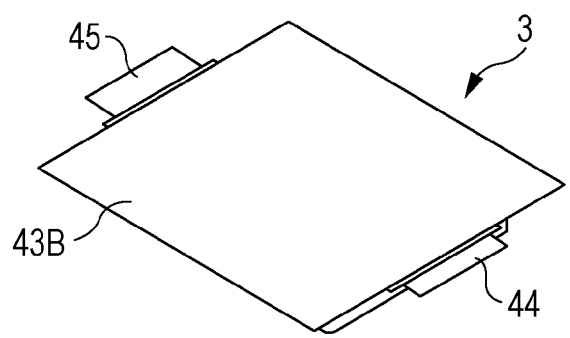

FIG. 15A is a schematic diagram illustrating the outward appearance of the cell 3 according to an embodiment of the present disclosure. FIG. 16 is a six-sided view of the cell 3. The cell 3 is a non-aqueous electrolyte cell such as a lithium-ion secondary cell. FIG. 15B is a schematic diagram illustrating the configuration of the cell 3. FIG. 15B illustrates the configuration of the cell 3 with the bottom and top faces of the cell 3 reversed from those illustrated in FIG. 15A. FIG. 15C is a schematic diagram illustrating the bottom side of the outward appearance of the cell 3. The cell 3 includes a cell element 42, and a packaging member 43 that accommodates the cell element 42. The cell 3 has a first principal face and a second principal face.

The packaging member 43 includes a first packaging part 43A that accommodates the cell element 42, and a second packaging part 43B that functions as a lid covering the cell element 42. Preferably, the packaging member 43 and the cell element 42 are in intimate contact with each other. As an example, the thickness of the cell element 42 is set to about 5 mm to 20 mm. The discharge capacity of the cell element 42 is in the range of, for example, not less than 3 Ah and not more than 50 Ah.

The cell element 42 has a stacked electrode structure in which substantially rectangular cathodes and substantially rectangular anodes placed facing the cathodes are stacked alternately with a separator in between. Also, an exposed cathode current collector part and an exposed anode current collector part are led out from the cell element 42. The exposed cathode current collector part is connected to each of multiple cathodes. The exposed anode current collector part is connected to each of multiple anodes. A cathode tab 44 and an anode tab 45 are connected to the exposed cathode current collector part and the exposed anode current collector part, respectively.

As the material of the cathode tab 44 and the anode tab 45, for example, a material such as nickel (Ni), copper (Cu), aluminum (Al), stainless (SUS), or titanium aluminum (TiAl), or an alloy containing phosphorus (P), silver (Ag), tin (Sn), iron (Fe), zirconium (Zr), chromium (Cr), silicon (Si), magnesium (Mg), or nickel (Ni) can be used. Of these materials, copper (Cu), aluminum (Al), or a copper (Cu) alloy is particularly preferred.

The cell element 42 described above is packaged in the packaging member 43, with the cathode tab 44 and the anode tab 45 led to the outside of the cell 3 from the sealed part of the packaging member 43. The packaging member 43 has a depression 46 formed by applying deep drawing to at least one or both faces. The cell element 42 is contained in the depression 46. In FIG. 15B, the depression 46 is formed in the first packaging part 43A of the packaging member 43, and the cell element 42 is contained in the depression 46.

Then, the second packaging part 43B is placed so as to cover the opening of the depression 46, and the area around the opening of the depression 46 is sealed by adhesion such as welding. The cathode tab 44 and the anode tab 45 respectively connected to the cathode and anode current collectors are led out from two opposing sides.

Figure 15D:
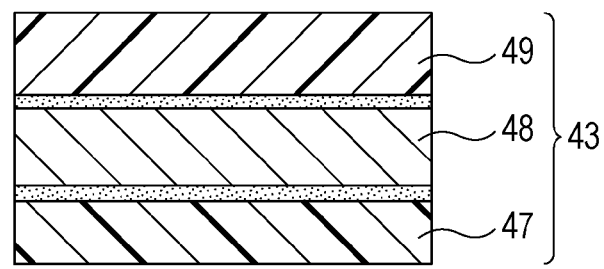

The packaging member 43 is, for example, a film having flexibility. As illustrated in FIG. 15D, the packaging member 43 has a structure in which a thermo-fusible resin layer 47, a metal layer 48, and a surface protection layer 49 are stacked in order via an adhesion layer. The face on the thermo-fusible resin layer 47 side is the side where the cell element 42 is accommodated. The surface of the thermo-fusible resin layer 47 and cell element 42 are preferably in intimate contact with each other. Examples of the material of the thermo-fusible resin layer 47 include polypropylen (PP) and polyethylene (PE). As the material of the metal layer 48, a metal having flexibility is preferred, for example, aluminum (Al) or an aluminum (Al) alloy. Examples of the material of the surface protection layer 49 include nylon (Ny) and polyethylene terephthalate (PET).

Specifically, for example, the packaging member 43 is made of an aluminum laminated film including a polyethylene film, an aluminum foil, a nylon film bonded together in this order. The packaging material 43 is placed so that its polyethylene film side faces the cell element 42, with their outer edges brought into intimate contact with each other by fusing or an adhesive. Instead of the aluminum laminated film mentioned above, the packaging material 43 may be made of a laminated film having another structure, a polymer film such as polypropylen, or a metal film.

The configuration of a cell according to an embodiment of the present disclosure is not limited to the above-mentioned configuration. For example, it is also possible to use a stacked configuration obtained by forming separators in an elongated strip shape, folding back the separators in a zigzag fashion, and placing the cathode and anode between the separators that have been folded back. Further, it is also possible to use a configuration in which a rolled electrode with the cathode and anode leads attached is accommodated in a film-like packaging member.

The cathode tab 44 of the cell 3 mentioned above is led to the outside from one side face of the bracket 2, and joined to the cell busbar 4A. The anode tab 45 is led to the outside from the other side face of the bracket 2, and joined to the cell busbar 4B.

"Base Plate"

Figure 18:
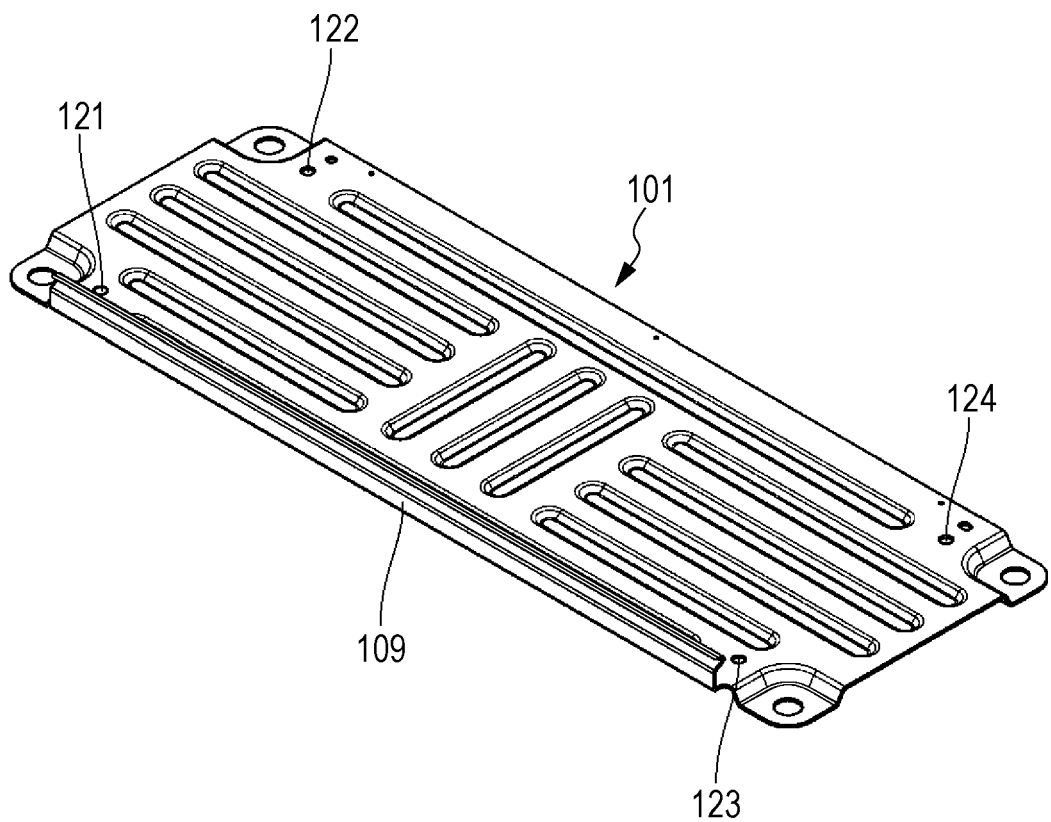
FIG. 18 is a perspective view of a base plate.

FIG. 17 is a six-sided view of the base plate 101. FIG. 18 is a perspective view of the base plate 101. The base plate 101 is made of metal such as iron. The retention part 109 is molded integrally along one end face of the base plate 101 which extends in the stacking direction. The retention part 109 is inserted into the depression in the lower part of the side face of the group of cells 105. Screw holes 121 and 122 for fixing the end plate 102 in place are formed at one end of the base plate 101. Screw holes 123 and 124 for fixing the end plate 103 in place are formed at the other end of the base plate 101.

Figure 19:
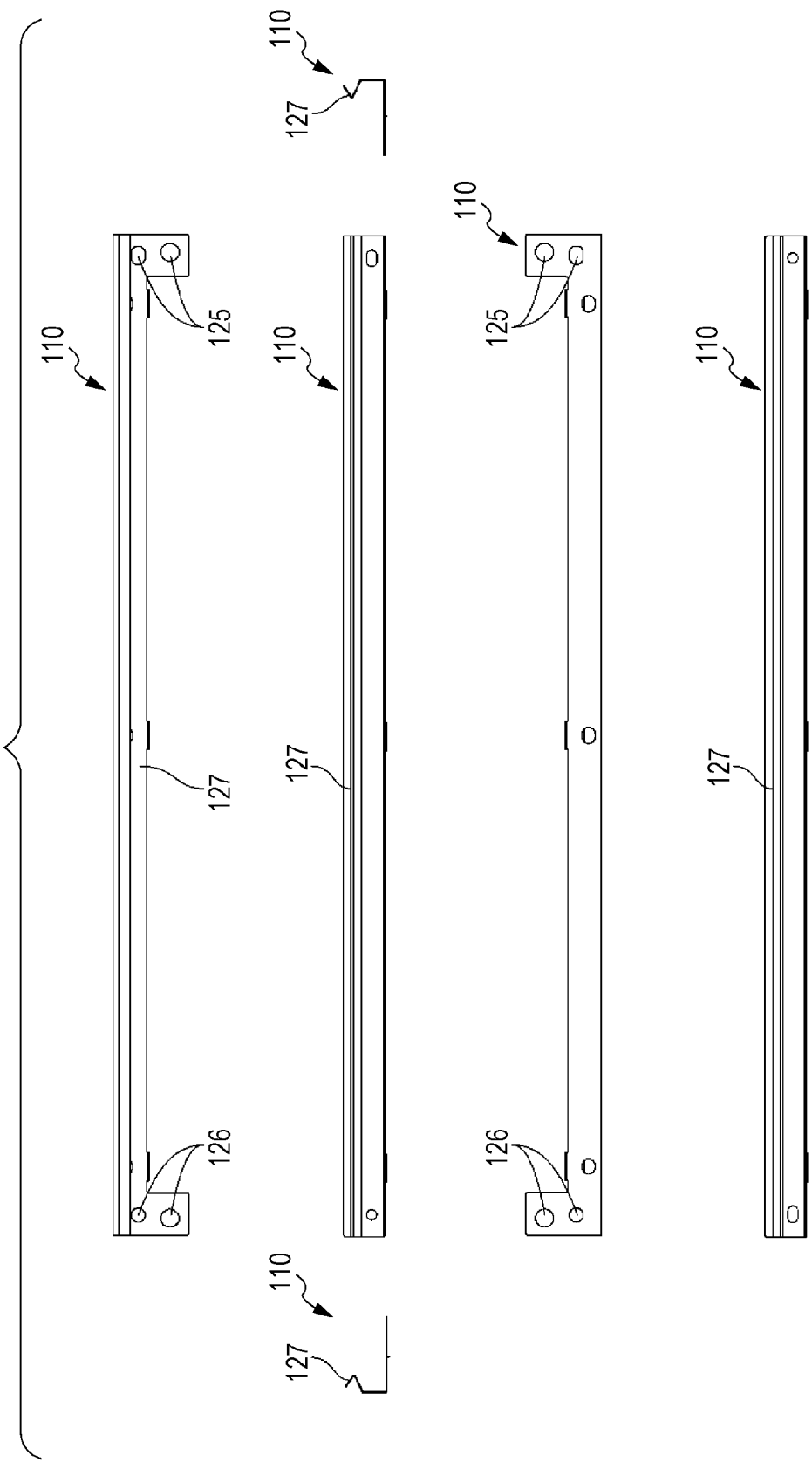
FIG. 19 is a six-sided view illustrating the configuration of a spring plate.

The spring plate 110 is fitted to the end face on the side of the base plate 101 where the retention part 109 is not formed. FIG. 19 is a six-sided view of the spring plate 110. Screw holes 125 and 126 for attaching the spring plate 110 to the base plate 101 are formed at both ends of the spring plate 110. The spring plate 110 is a plate spring. A movable end 127 of the spring plate 110 which has a V-shaped cross section is inserted into the depression in the lower part of the group of cells 105. The spring force of the spring plate 110 causes the group of cells 105 to be squeezed between the retention part 109 of the base plate 101 and the spring plate 110.

Although a screw is the most commonly used component for fixing the group of cells 105 to the base plate 101, use of a screw is also a factor that increases overall weight. In the case of high output, high capacity batteries, energy density per volume is an important consideration. Similarly, energy density per weight is also an important consideration. Therefore, frequent use of a screw is not preferred.

According to an embodiment of the present disclosure, as mentioned above, by holding down the group of cells 105 with the retention part 109 and the spring plate 110, the group of cells 105 can be fixed in place without use of a screw. Therefore, an increase in overall weight can be minimized. Further, assembly is easy.

"End Plates"

Figure 20:
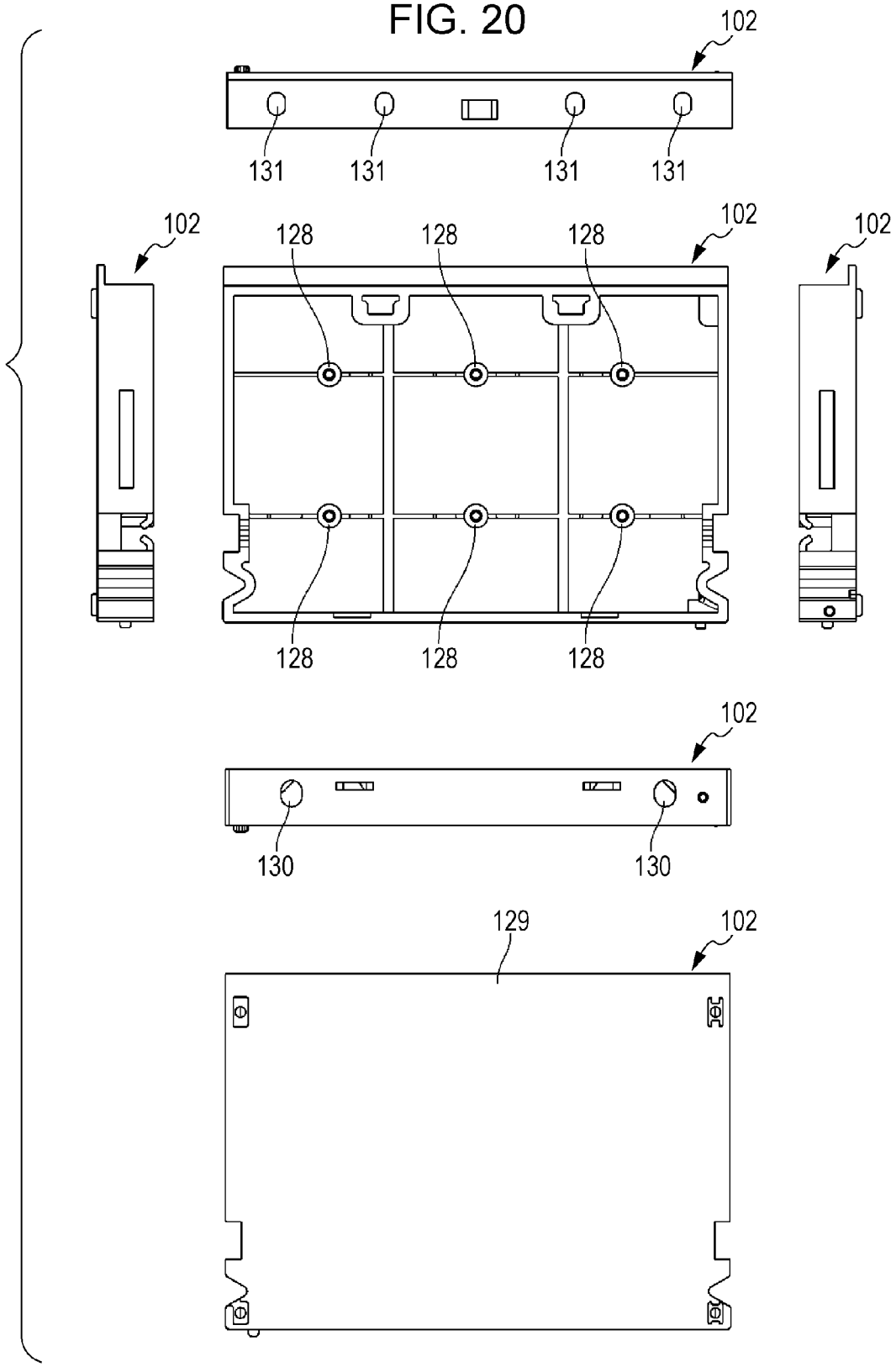
FIG. 20 is a six-sided view illustrating the configuration of an end plate.

FIG. 20 is a six-sided view of the end plate 102. The end plate 103 is of the same configuration as the end plate 102. A grid-like rib is formed on the outer side face of the end plate 102 that is a resin molded component. Multiple bosses 128 are formed in the portion of the rib. The bosses 128 each have a screw hole 128, making it possible to attach the circuit board 104 onto the outer side of the end plate 102.

A principal face 129 on the inner side of the end plate 102 which faces the group of cells 105 is formed as a flat face. The principal face 129 is brought into intimate contact with the bracket at the end of the group of cells 105. The bottom face of the end plate 102 has elongated holes 130 for attaching the end plate 102 to the base plate 101. The top face of the end plate 102 has holes 131 for attaching the top plate 111.

The group of cells 105 is placed in the space between the opposing end plates 102 and 103. The end plate 102 is movable in the stacking direction of the group of cells 105, and the end plate 103 is stationary. The amount of allowed movement is not less than the amount of dimensional variation that occurs when pressure is applied to the group of cells 105 in the stacking direction. Since the coupling parts 23A to 23D are able to contract, applying pressure to the group of cells 105 in the stacking direction leads to a tighter stacking of the battery units. As a result, rattling of the group of cells 105 can be avoided. Accordingly, the length of the group of cells 105 along the stacking direction is not fixed at its design value but fluctuates. The end plate 102 is thus made movable in the stacking direction in order to adapt to this fluctuation.

Figure 21:
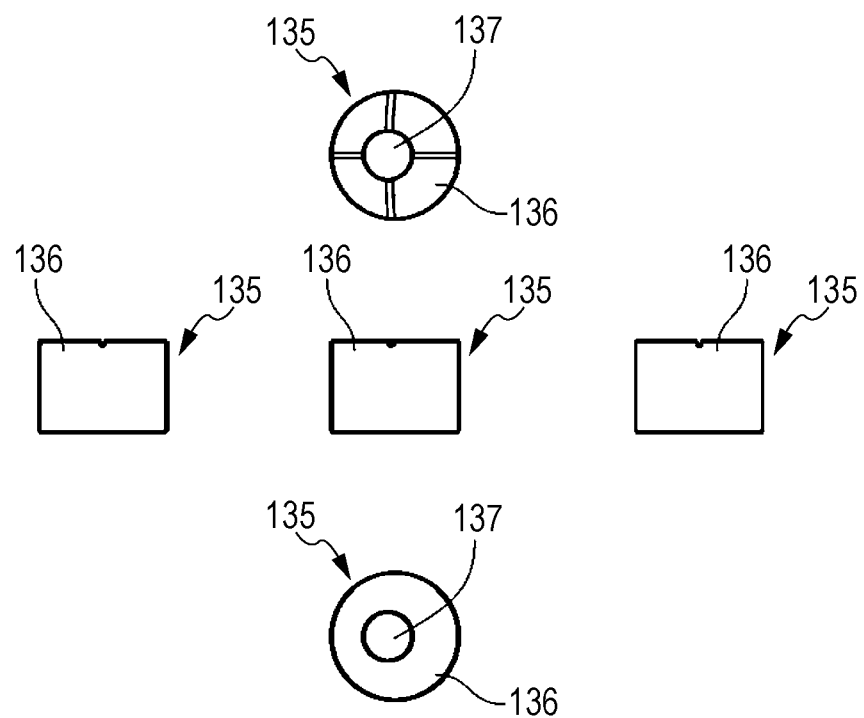
FIG. 21 is a five-sided view illustrating an eccentric cam.

The eccentric cam 135 is used to make the end plate 102 movable. FIG. 21 is a five-sided view (front, plan, bottom, and both sides) of the eccentric cam 135. The eccentric cam 135 has a shaft hole 137 formed in a cylindrical rotary part 136. The shaft hole 137 is formed at a position shifted from the center position of the cylinder. As a result, when the eccentric cam 135 is rotated by a shaft inserted into the shaft hole 137, the distance between the center of the shaft and the peripheral face of the rotary part 136 varies with the rotation angle.

The eccentric cam 135 mentioned above is used for attaching the base of the end plate 102 as illustrated in FIGS. 2 and 3. Accordingly, as illustrated in FIGS. 22A and 22B, the position of the outer side face of the end plate 102 can be varied by the eccentric cam 135. For example, as illustrated in FIG. 22A, in the state in which the group of cells 105 is contracted in the stacking direction, a slight gap is present between the peripheral face of the rotary part 136 of the eccentric cam 135 and the end plate 102. In this case, the eccentric cam 135 is rotated to bring the peripheral face of the rotary part 136 of the eccentric cam 135 into intimate contact with and the end plate 102 as illustrated in FIG. 22B. Therefore, the eccentric cam 135 can keep the state of intimate contact between the battery units of the group of cells 105.

There are times when assembly of the battery module becomes difficult owing to dimensional variations among individual battery units or the like. Use of the eccentric cam 135 mentioned above makes it possible to absorb variations in component dimensions, and hold down the battery packs reliably in place. Another advantage is that it is unnecessary to prepare multiple components with different dimensions in accordance with such component variations. Further, it is possible to prevent rattling of the assembled structure due to factors such as resin expansion/contraction or vibration.

"Top Plate"

Figure 23:
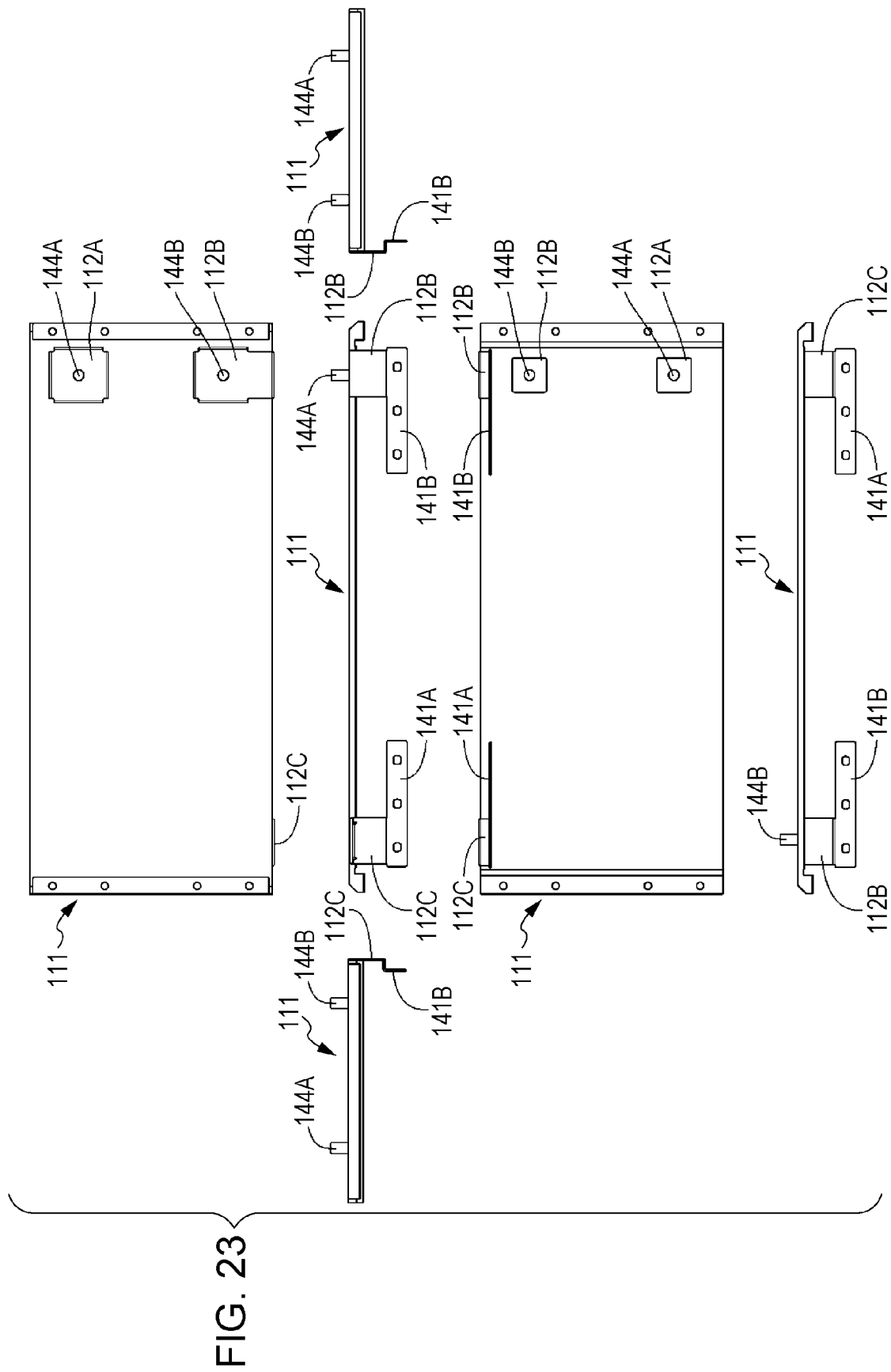
FIG. 23 is a six-sided view illustrating the configuration of a top plate.
Figure 24A:
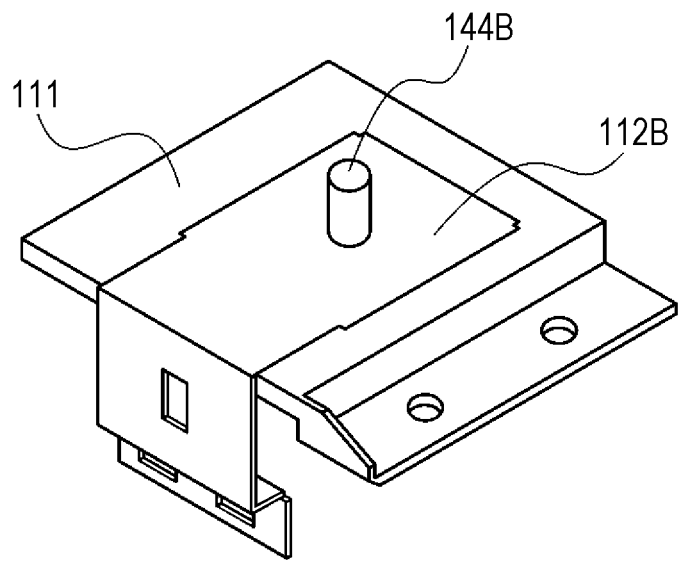
FIGS. 24A and 24B are perspective views illustrating the configuration of a terminal portion.
Figure 24B:
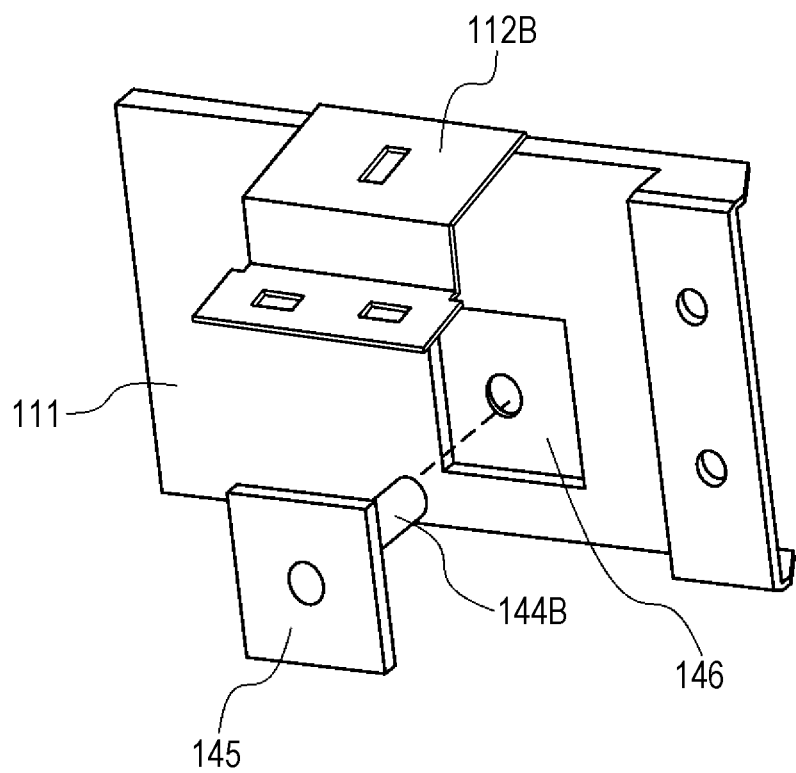

FIG. 23 is a six-sided view of the top plate 111. FIGS. 24A and 24B are perspectives view illustrating the structure of terminals. The top plate 111 is a resin molded component. Busbars 141A and 141B are attached to terminals 112B and 112C, respectively. The busbars 141A and 141B are connected to the final positive and negative electric power drawing positions of the group of cells 105, respectively. The terminal 112B has an L-shaped cross section, and is extended to the top face of the top plate 111.

Figure 25A:
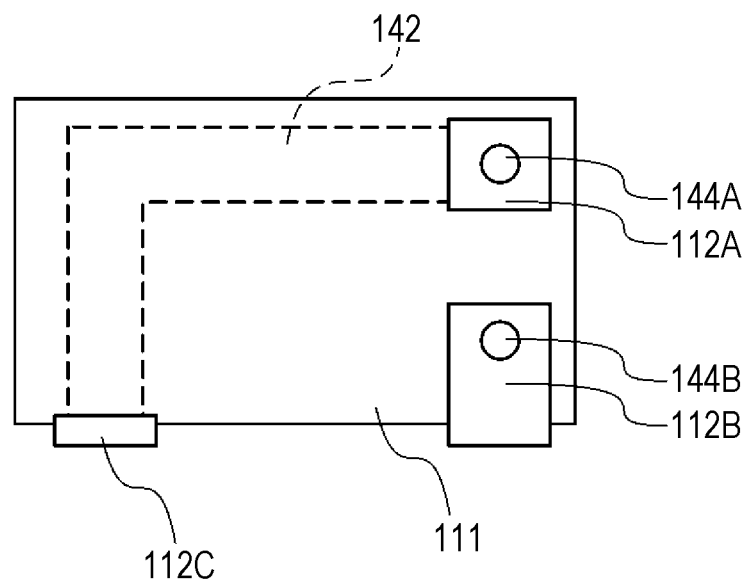
FIGS. 25A and 25B are schematic diagrams illustrating how terminals are drawn out.
Figure 25B:
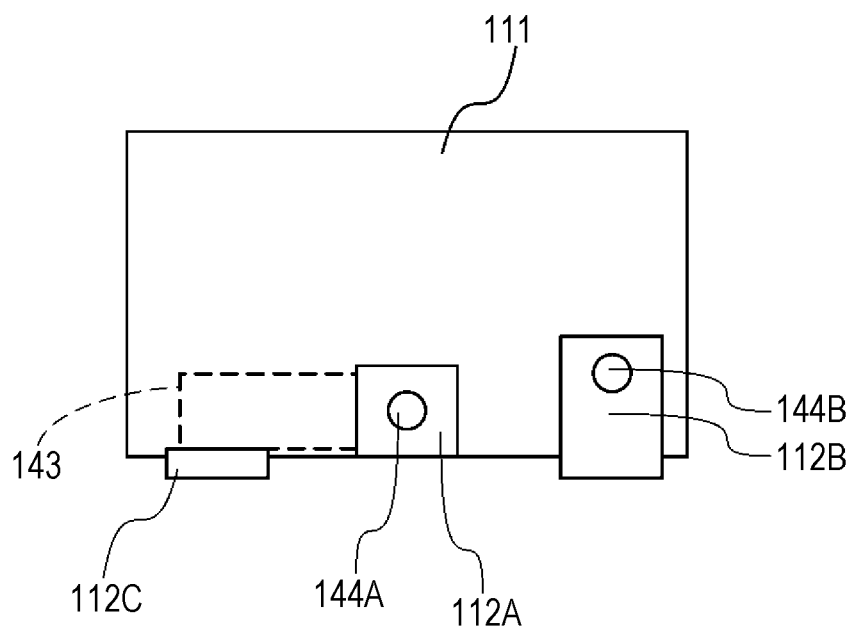

To place the terminals 112A and 112B along one short side of the top plate 111, a busbar 142 that connects between the terminal 112A and the terminal 112C is provided as indicated by a broken line in FIG. 25A. As illustrated in FIG. 25B, a busbar 143 that connects between the terminal 112C and the terminal 112A may be provided to place the terminals 112A and 112B along the long side of the top plate 111.

Terminal bolts 144A and 144B are projected from the terminals 112A and 112B. The terminal bolts 144A and 144B are used when connecting to another battery module. Each of the terminal bolts 144A and 144B is connected to the corresponding terminal bolt provided in another battery module by the busbar, thereby connecting multiple battery modules.

The terminal bolt 144A, 144B, and the terminal 112A, 112B are formed as separate components. As illustrated in FIG. 24B, a base 145 is secured to one end of the terminal bolt 144B by welding, caulking, or the like. A depression 146 is formed at a position on the back face of the top plate 111 corresponding to the terminal 112B. The depression 146 has a shape that conforms to the shape of the base 145. The base 145 is fitted into the depression 146 in the state in which the terminal bolt 144B passes through the hole in the terminal 112B. Likewise, the other terminal bolt 144A is a separate component from the terminal 112A.

When interconnecting multiple battery modules via the terminal 112A, 112B, there is a possibility that vibration applied during attaching or traction may cause stress to concentrate on the portion interconnecting the battery modules, leading to rupture of the terminal bolt. According to an embodiment of the present disclosure, the terminal bolt 144A, 144B is formed a separate component from the terminal 112A, 112B, thereby making it possible to prevent occurrence of localized stress in the terminal bolt 144A, 144B.

"Modification of Coupling Part"

In the above-mentioned embodiment, the coupling part includes the conical projection 24 and the depression 25. A rubber component 151 may be used as such a coupling part. FIG. 26 is a three-sided view illustrating an example of the rubber component 151. The rubber component 151 is generally barrel-shaped, and configured so as to contract in the height direction.

Figure 27A:
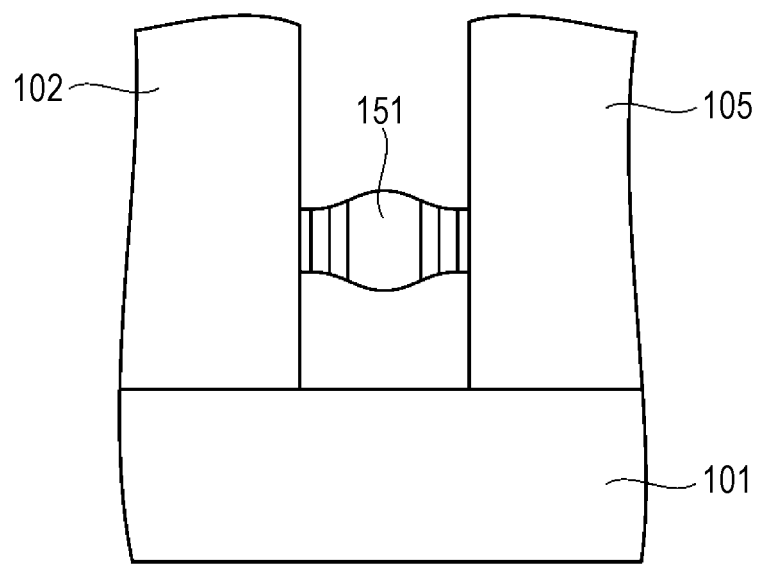
FIGS. 27A and 27B are schematic diagrams illustrating the function of an elastic member.
Figure 27B:
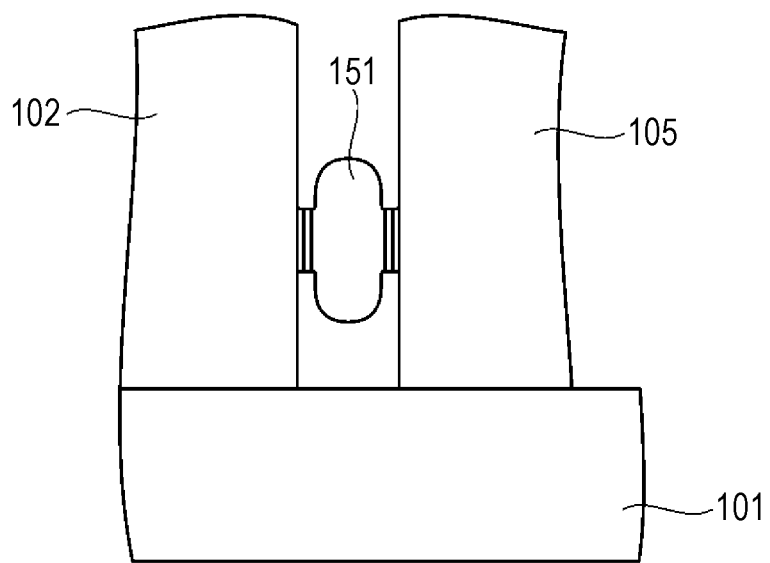

As schematically illustrated in FIG. 27A, the rubber component 151 is placed between the end plate 102 and the battery unit at one end side of the group of cells 105. When dimensional variations or the like exist, the rubber component 151 contracts as illustrated in FIG. 27B, absorbing the dimensional variations. In this way, use of the rubber component 151 makes it possible to absorb variations in component dimensions, and hold down the group of cells 105 reliably in place. Another advantage is that it is unnecessary to prepare multiple components with different dimensions in accordance with such component variations. In the case of using the rubber component 151, it is not necessary to make one of the end plates 102 and 103 movable but both the end plates may be stationary.

The present disclosure can be also implemented in the configurations as mentioned below.

(1) A battery module including:

a plurality of battery supports that each have a face orthogonal to a stacking direction, and a side face, the battery supports each containing a plurality of cells and being made of an insulating material;

a coupling part that is located between the face of one of the battery supports and the face of another one of the battery supports adjacent to the one battery support, and contracts in the stacking direction when the battery supports are stacked so as to bring the faces of the battery supports into intimate contact with each other;

a group of cells that has the battery supports stacked together with the coupling part being placed between the battery supports;

a base plate; and a first regulating plate and a second regulating plate that are placed in a standing position on the base plate so as to face each other, the first and second regulating plates sandwiching the group of cells that is arranged in a space over which the first and second regulating plates face each other, and stacked in a state wherein the coupling part is contracted.

(2) The battery module according to (1), wherein:

the coupling part has a projection that is formed in the face of the one battery support, and a depression that is formed at a position of the face of the other battery support corresponding to the projection;

the coupling part has a gap defined between a surface of the projection and an inner face of the depression in a state in which the projection and the depression are fitted to each other; and the surface of the projection and the inner face of the depression come into intimate contact with each other when the one battery support and the other battery support are brought into intimate contact with each other.

(3) The battery module according to (1) or (2), further including a displacement generating part that is provided in association with one of the first and second regulating plates to make the one of the first and second regulating plates movable in the stacking direction with respect to the base plate.

(4) The battery module according to any one of (1), (2), and (3), wherein the coupling part includes an elastic member that contracts in the stacking direction, the elastic member being located between the face of the one battery support and the face of the other battery support that face each other.

(5) The battery module according to any one of (1), (2), (3), and (4), wherein each of the battery supports has a slit that is formed in the side face in a state in which two of the battery supports are brought into intimate contact with each other.

(6) The battery module according to any one of (1), (2), (3), (4), and (5), wherein each of the battery supports has an opening that exposes a principal face of each of the cells contained within each of the battery supports.

(7) The battery module according to any one of (1), (2), (3), (4), (5), and (6), further including a first plate-like conductive member that is attached to the side face of each of the battery supports, wherein:
the cells each have an electrode; and
the electrode of each of the cells contained within each of the battery supports is joined to the first plate-like conductive member.

(8) The battery module according to any one of (1), (2), (3), (4), (5), (6), and (7), further including:
a first plate-like conductive member that is attached to the side face of each of the battery supports, and connects between the cells contained within each of the battery supports; and
a second plate-like conductive member that is attached substantially orthogonally to the first plate-like conductive member, and is electrically connected to the first plate-like conductive member,
wherein the second plate-like conductive member establishes connection in the group of cells.

(9) The battery module according to any one of (1), (2), (3), (4), (5), (6), (7), and (8), further including:
a first plate-like conductive member that is attached to the side face of each of the battery supports, and connects between the cells contained within each of the battery supports; and
a second plate-like conductive member that is attached substantially orthogonally to the first plate-like conductive member, and is electrically connected to the first plate-like conductive member,
wherein the second plate-like conductive member establishes connection in the group of cells, and
the second plate-like conductive member is supported separately from each of the battery supports.

(10) The battery module according to any one of (1), (2), (3), (4), (5), (6), (7), (8), and (9), further including:
a first plate-like conductive member that is attached to the side face of each of the battery supports, and connects between the cells contained within each of the battery supports; and
a second plate-like conductive member that is attached substantially orthogonally to the first plate-like conductive member, and is electrically connected to the first plate-like conductive member,
wherein the second plate-like conductive member establishes connection in the group of cells, and
the battery module further includes an insulating member that covers a portion of a surface of the first plate-like conductive member other than a connecting portion of the first and second plate-like conductive members.

(11) The battery module according to any one of (1), (2), (3), (4), (5), (6), (7), (8), (9), and (10), further including a guide member that is made of an insulating material, and has a position regulating window extending in the stacking direction of the group of cells,
wherein the second plate-like conductive member is attached by placing the second plate-like conductive member in the position regulating window in advance.

(12) The battery module according to any one of (1), (2), (3), (4), (5), (6), (7), (8), (9), (10), and (11), further including:
a top plate that faces the base plate;
a terminal that is electrically connected to a connection terminal position of the group of cells, and is led out to an outer face of the top plate; and
a terminal bolt that is projected from the terminal,
wherein the terminal bolt is supported separately from the top plate.

(13) The battery module according to any one of (1), (2), (3), (4), (5), (6), (7), (8), (9), (10), (11), and (12), further including a temperature detecting member that has a temperature detecting element on one face, the temperature detecting element detecting a temperature of each of the cells contained within each of the battery supports,
wherein each of the battery supports has an opening formed in the side face, and
the temperature detecting member is fitted into the opening.

"Electric Power Storage System for Housing as Application Example"

An example of an embodiment of the present disclosure applied to an electric power storage system for housing is described with reference to FIG. 28. For example, in an electric power storage system 200 designed for a house 201, electric power is supplied to an electric power storage device 203 from a centralized power system 202 including thermal power generation 202a, nuclear power generation 202b, hydraulic power generation 202c, and the like, via a power grid 209, an information grid 212, a smart meter 207, a power hub 208, and the like. Electric power is also supplied to the electric power storage device 203 from an independent power source such as an in-home generator 204. The electric power supplied to the electric power storage device 203 is stored. The electric power storage device 203 is used to supply electric power used in the house 201. The same electric power storage system can be used not only for the house 201 but also for an office building.

The house 201 is equipped with the in-home generator 204, power consuming devices 205, the electric power storage device 203, a controller 210 that controls various devices, a smart meter 207, and various sensors 211 that acquire various kinds of information. These devices are interconnected by the power grid 209 and the information grid 212. As the in-home generator 204, a solar cell, a fuel cell, or the like is used. Electric power generated by the in-home generator 204 is supplied to the power consuming devices 205 and/or the electric power storage device 203. The power consuming devices 205 include a refrigerator 205a, an air conditioner 205b, a television receiver 205c, a bath 205d, and the like. Further, the power consuming devices 205 include electric vehicles 206. The electric vehicles 206 include an electric automobile 206a, a hybrid car 206b, and an electric motorcycle 206c.

The battery module according to an embodiment of the present disclosure mentioned above is applied to the electric power storage device 203. The electric power storage device 203 includes a secondary battery or a capacitor. For example, the electric power storage device 203 includes a lithium-ion battery. The lithium-ion battery may be of a stationary type or may be a lithium-ion battery used in the electric vehicles 206. The smart meter 207 has the function of measuring the amount of commercial power used, and transmitting information on the measured usage amount to a power company. The power grid 209 may be one of DC power supply, AC power supply, and non-contact power supply, or a combination of multiples ones of these power supplies.

The sensors 211 include, for example, a human sensor, an illuminance sensor, an object detection sensor, a power consumption sensor, a vibration sensor, a contact sensor, a temperature sensor, and an infrared sensor. Information acquired by the sensors 211 is transmitted to the controller 210. On the basis of the information from the sensors 211, information on meteorological conditions, human conditions, and the like is grasped, and the power consuming devices 205 are automatically controlled to minimize energy consumption. Further, the controller 210 can transmit information related to the house 201 to a power company or the like outside the house via the Internet.

The power hub 208 executes processing such as power line branching and DC-AC conversion. Examples of the communication scheme for the information grid 212 connected to the controller 210 include use of a communication interface such as universal asynchronous receiver-transceiver (UART), and use of a sensor network based on a wireless communication standard such as Bluetooth, ZigBee, or Wi-Fi. The Bluetooth scheme is applied to multimedia communications, and enables communications via one-to-many connection. The ZigBee scheme uses the physical layer of the Institute of Electrical and Electronics Engineers (IEEE)802.15.4. The IEEE802.15.4 is the name of a short-range wireless network standard called personal area network (PAN) or wireless (W)-PAN.

The controller 210 is connected to an external server 213. The server 213 may be managed by one of the house 201, a power company, and a service provider. Information transmitted and received by the server 213 includes, for example, power consumption information, lifestyle pattern information, electricity bills, weather information, natural disaster information, and information related to power transaction. While these pieces of information may be transmitted and received by power consuming devices (e.g. television receiver) within a home, these pieces of information may be also transmitted and received by devices (e.g. portable telephone) located outside the home. These pieces of information may be also displayed on an apparatus with a display function, for example, a television receiver, a portable telephone, or a personal digital assistant (PDA).

The controller 210 that controls various units includes a central processing unit (CPU), a random access memory (RAM), a read only memory (ROM), and the like. In the present example, the controller 210 is housed in the electric power storage system 203. The controller 210 is connected to the electric power storage system 203, the in-home generator 204, the power consuming devices 205, the sensors 211, and the server 213 via the information grid 212. The controller 210 has the function of adjusting the amount of use of commercial power and the amount of power generation, for example. The controller 210 may also have the function of conducting power transactions in the electric power market, for example.

As described above, not only electric power from the centralized power system including the thermal power generation 202a, the nuclear power generation 202b, the hydraulic power generation 202c, and the like, but also electric power generated by the in-home generator 204 (photovoltaic power generation, wind power generation, etc.) can be stored in the electric power storage device 204. Therefore, even when the amount of power generated by the in-home generator 204 fluctuates, it is possible to keep the amount of electric power delivered to the outside constant, or discharge any necessary amount of electric power. For example, it is also possible to use the electric power storage system 200 in such a way as to store electric power obtained by photovoltaic power generation in the electric power storage device 203, store cheap midnight power in the electric power storage device 203 during nighttime hours, and discharge the electric power stored in the electric power storage device 203 during daytime hours when electricity is expensive.

While the controller 210 is housed in the electric power storage device 203 in the present example, the controller 210 may be housed in the smart meter 207, or may be an independent component. Further, the electric power storage system 200 may be used for multiple households in an apartment house, or may be used for multiple detached houses.

"Vehicular Electric Power Storage System as Application Example"

Figure 29:
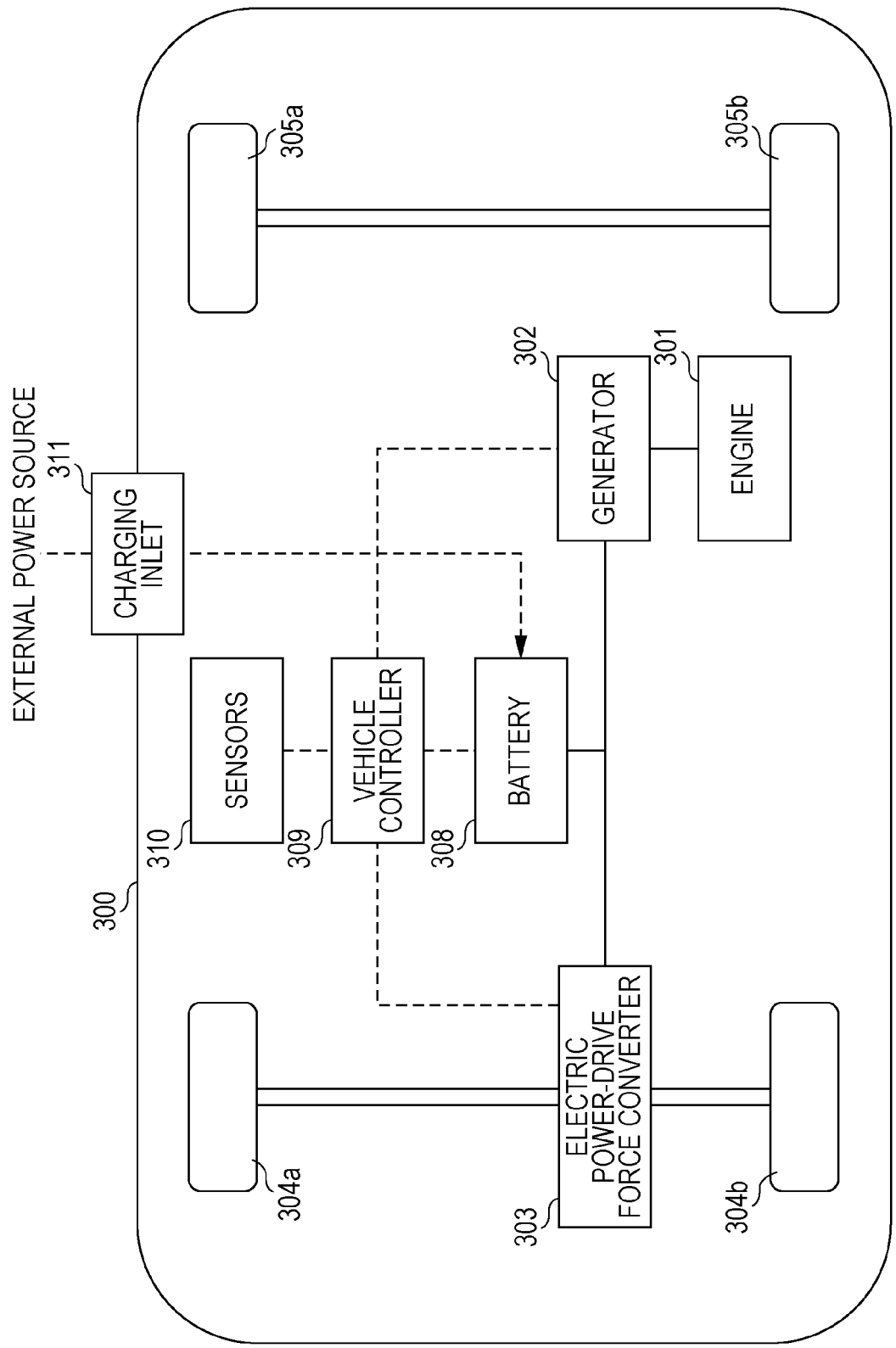
FIG. 29 is a schematic diagram illustrating another application example of a battery module.

An example of an embodiment of the present disclosure applied to a vehicular electric power storage system is described with reference to FIG. 29. FIG. 29 schematically illustrates an example of the configuration of a hybrid vehicle that employs a series-hybrid system according to an embodiment of the present disclosure. A series-hybrid system refers to a type of vehicle that runs on an electric power-drive force converter by using electric power generated by a generator that is driven by an engine, or such generated electric power once stored in a battery.

A hybrid vehicle 300 is equipped with an engine 301, a generator 302, an electric power-drive force converter 303, a driving wheel 304a, a driving wheel 304b, a wheel 305a, a wheel 305b, a battery 308, a vehicle controller 309, sensors 310, and a charging inlet 311. The battery unit according to an embodiment of the present disclosure mentioned above is applied to the battery 308.

The hybrid vehicle 300 runs on the electric power-drive force converter 303 as the power source. An example of the electric power-drive force converter 303 is a motor. The electric power-drive force converter 303 activates with the electric power from the battery 308, and the rotational force of the electric power-drive force converter 303 is transmitted to the driving wheel 304a, 304b. By using DC-AC conversion or reverse conversion (AC-DC conversion) for necessary locations, the electric power-drive force converter 303 can be also implemented as either one of an AC motor or a DC motor. The sensors 310 control the engine speed or control the opening of a throttle valve (not illustrated) (throttle opening) via the vehicle controller 309. The sensors 310 include a speed sensor, an acceleration sensor, an engine speed sensor, and the like.

The rotational force of the engine 301 is transmitted to the generator 302. Electric power generated by the generator 302 on the basis of the rotational force can be stored in the battery 308.

When the hybrid vehicle is decelerated by a brake mechanism (not illustrated), the resistance created on deceleration is applied to the electric power-drive force converter 303 as a rotational force. On the basis of this rotational force, regenerative power generated by the electric power-drive force converter 303 is stored in the battery 308.

By connecting the battery 308 to a power source outside the hybrid vehicle, it is also possible for the battery 308 to receive supply of electric power from the external power source through the charging inlet 311 as an input port, and store the received electric power.

Although not illustrated, there may be also provided an information processing apparatus that performs information processing related to vehicle control on the basis of information related to a secondary battery. Examples of such information processing apparatus include an information apparatus that displays remaining battery charge on the basis of information related to the remaining charge of a battery.

The foregoing description is directed to the case of a series-hybrid vehicle that runs on a motor by using electric power generated by a generator that is driven by an engine, or such generated electric power once stored in a battery. The present disclosure can be effectively applied to a parallel-hybrid vehicle that uses both engine and motor outputs as drive sources, and is appropriately switched between three modes, including a mode in which the vehicle runs on the engine alone, a mode in which the vehicle runs on the motor alone, and a mode in which the vehicle runs on both the engine and the motor. Further, the present disclosure can be also effectively applied to a so-called electric vehicle that runs on the drive by the drive motor alone, without using the engine.

"Modifications"

While embodiments of the present disclosure have been described above in detail, embodiments of the present disclosure are not limited to the above-mentioned embodiments but various modifications are possible on the basis of the technical idea of the present disclosure. For example, the configurations, methods, steps, shapes, numerical values, and the like described with regard to the above-mentioned embodiments are only illustrative, and configurations, methods, steps, shapes, numerical values, and the like different from these may be used as necessary.

Also, the configurations, methods, steps, shapes, numerical values, and the like according to the above-mentioned embodiments may be combined with each other without departing from the scope of the present disclosure.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery module comprising:
   a plurality of battery supports that each have a face orthogonal to a stacking direction, and a side face, the battery supports each containing a plurality of cells and being made of an insulating material;
   a coupling part that is located between the face of one of the battery supports and the face of another one of the battery supports adjacent to the one battery support, and contracts in the stacking direction when the battery supports are stacked so as to bring the faces of the battery supports into intimate contact with each other;
   a group of cells that has the battery supports stacked together with the coupling part being placed between the battery supports;
   a base plate; and
   a first regulating plate and a second regulating plate that are placed in a standing position on the base plate so as to face each other, the first and second regulating plates sandwiching the group of cells that is arranged in a space over which the first and second regulating plates face each other, and stacked in a state in which the coupling part is contracted;
   a first plate-like conductive member that is attached to the side face of each of the battery supports, and connects between the cells contained within each of the battery supports; and
   a second plate-like conductive member that is attached substantially orthogonally to the first plate-like conductive member, and is electrically connected to the first plate-like conductive member,
   wherein the second plate-like conductive member establishes connection in the group of cells.

2. The battery module according to claim 1, wherein:
   the coupling part has
      a projection that is formed in the face of the one battery support, and
      a depression that is formed at a position of the face of the other battery support corresponding to the projection;
   the coupling part has a gap defined between a surface of the projection and an inner face of the depression in a state in which the projection and the depression are fitted to each other; and
   the surface of the projection and the inner face of the depression come into intimate contact with each other when the one battery support and the other battery support are brought into intimate contact with each other.

3. The battery module according to claim 1, further comprising a displacement generating part that is provided in association with one of the first and second regulating plates to make the one of the first and second regulating plates movable in the stacking direction with respect to the base plate.

4. The battery module according to claim 1, wherein the coupling part includes an elastic member that contracts in the stacking direction, the elastic member being located between the face of the one battery support and the face of the other battery support that face each other.

5. The battery module according to claim 1, wherein each of the battery supports has a slit that is formed in the side face in a state in which two of the battery supports are brought into intimate contact with each other.

6. The battery module according to claim 1, wherein each of the battery supports has an opening that exposes a principal face of each of the cells contained within each of the battery supports.

7. The battery module according to claim 1, wherein:
   the cells each have an electrode; and
   the electrode of each of the cells contained within each of the battery supports is joined to the first plate-like conductive member.

8. The battery module according to claim 1, further comprising a guide member that is made of an insulating material, and has a position regulating window extending in the stacking direction of the group of cells,
   wherein the second plate-like conductive member is attached by placing the second plate-like conductive member in the position regulating window in advance.

9. The battery module according to claim 1, further comprising:
   a top plate that faces the base plate;
   a terminal that is electrically connected to a connection terminal position of the group of cells, and is led out to an outer face of the top plate; and
   a terminal bolt that is projected from the terminal,
   wherein the terminal bolt is supported separately from the top plate.

10. The battery module according to claim 1, further comprising a temperature detecting member that has a temperature detecting element on one face, the temperature detecting element detecting a temperature of each of the cells contained within each of the battery supports,
    wherein each of the battery supports has an opening formed in the side face, and
    the temperature detecting member is fitted into the opening.

11. An electric power storage system comprising:
    the battery module according to claim 1; and
    a generator that generates electric power from renewable energy,
    wherein the battery module is charged by the generator.

12. An electric power storage system comprising:
    the battery module according to claim 1; and
    an electronic apparatus connected to the battery module,
    wherein the electric power storage system supplies electric power to the electronic apparatus.

13. An electronic apparatus that receives supply of electric power from the battery module according to claim 1.

14. An electric vehicle comprising:
the battery module according to claim 1;
a converter that receives supply of electric power from the battery module, and converts the electric power into a drive force for the electric vehicle; and
a controller that performs information processing related to vehicle control on a basis of information related to the battery module.

15. An electric power system comprising:
the battery module according to claim 1; and
an electric power information transmitting and receiving unit that transmits and receives a signal to and from another apparatus via a network,
wherein the electric power system controls charging and discharging of the battery module on a basis of information received by the electric power information transmitting and receiving unit.

16. An electric power system comprising:
the battery module according to claim 1;
a generator; and
a power grid,
wherein the electric power system receives supply of electric power from the battery module, or supplies electric power to the battery module from the generator or the power grid.

17. A battery module comprising:
a plurality of battery supports that each have a face orthogonal to a stacking direction, and a side face, the battery supports each containing a plurality of cells and being made of an insulating material;
a coupling part that is located between the face of one of the battery supports and the face of another one of the battery supports adjacent to the one battery support, and contracts in the stacking direction when the battery supports are stacked so as to bring the faces of the battery supports into intimate contact with each other;
a group of cells that has the battery supports stacked together with the coupling part being placed between the battery supports;
a base plate; and
a first regulating plate and a second regulating plate that are placed in a standing position on the base plate so as to face each other, the first and second regulating plates sandwiching the group of cells that is arranged in a space over which the first and second regulating plates face each other, and stacked in a state in which the coupling part is contracted;
a first plate-like conductive member that is attached to the side face of each of the battery supports, and connects between the cells contained within each of the battery supports; and
a second plate-like conductive member that is attached substantially orthogonally to the first plate-like conductive member, and is electrically connected to the first plate-like conductive member,
wherein the second plate-like conductive member establishes connection in the group of cells, and
the second plate-like conductive member is supported separately from each of the battery supports.

18. The battery module according to claim 17, further comprising a guide member that is made of an insulating material, and has a position regulating window extending in the stacking direction of the group of cells,
wherein the second plate-like conductive member is attached by placing the second plate-like conductive member in the position regulating window in advance.

19. The battery module according to claim 17, further comprising:
a top plate that faces the base plate;
a terminal that is electrically connected to a connection terminal position of the group of cells, and is led out to an outer face of the top plate; and
a terminal bolt that is projected from the terminal,
wherein the terminal bolt is supported separately from the top plate.

20. The battery module according to claim 17, further comprising a temperature detecting member that has a temperature detecting element on one face, the temperature detecting element detecting a temperature of each of the cells contained within each of the battery supports,
wherein each of the battery supports has an opening formed in the side face, and
the temperature detecting member is fitted into the opening.

21. An electric power storage system comprising:
the battery module according to claim 17; and
a generator that generates electric power from renewable energy,
wherein the battery module is charged by the generator.

22. An electric power storage system comprising:
the battery module according to claim 17; and
an electronic apparatus connected to the battery module,
wherein the electric power storage system supplies electric power to the electronic apparatus.

23. An electronic apparatus that receives supply of electric power from the battery module according to claim 17.

24. An electric vehicle comprising:
the battery module according to claim 17;
a converter that receives supply of electric power from the battery module, and converts the electric power into a drive force for the electric vehicle; and
a controller that performs information processing related to vehicle control on a basis of information related to the battery module.

25. An electric power system comprising:
the battery module according to claim 17; and
an electric power information transmitting and receiving unit that transmits and receives a signal to and from another apparatus via a network,
wherein the electric power system controls charging and discharging of the battery module on a basis of information received by the electric power information transmitting and receiving unit.

26. An electric power system comprising:
the battery module according to claim 17;
a generator; and
a power grid,
wherein the electric power system receives supply of electric power from the battery module, or supplies electric power to the battery module from the generator or the power grid.

27. A battery module comprising:
a plurality of battery supports that each have a face orthogonal to a stacking direction, and a side face, the battery supports each containing a plurality of cells and being made of an insulating material;
a coupling part that is located between the face of one of the battery supports and the face of another one of the battery supports adjacent to the one battery support, and contracts in the stacking direction when the battery supports are stacked so as to bring the faces of the battery supports into intimate contact with each other;

a group of cells that has the battery supports stacked together with the coupling part being placed between the battery supports;

a base plate; and a first regulating plate and a second regulating plate that are placed in a standing position on the base plate so as to face each other, the first and second regulating plates sandwiching the group of cells that is arranged in a space over which the first and second regulating plates face each other, and stacked in a state in which the coupling part is contracted;

a first plate-like conductive member that is attached to the side face of each of the battery supports, and connects between the cells contained within each of the battery supports; and a second plate-like conductive member that is attached substantially orthogonally to the first plate-like conductive member, and is electrically connected to the first plate-like conductive member, wherein the second plate-like conductive member establishes connection in the group of cells, and the battery module further comprises an insulating member that covers a portion of a surface of the first plate-like conductive member other than a connecting portion of the first and second plate-like conductive members.

28. The battery module according to claim 27, further comprising a guide member that is made of an insulating material, and has a position regulating window extending in the stacking direction of the group of cells, wherein the second plate-like conductive member is attached by placing the second plate-like conductive member in the position regulating window in advance.

29. The battery module according to claim 27, further comprising:

a top plate that faces the base plate;

a terminal that is electrically connected to a connection terminal position of the group of cells, and is led out to an outer face of the top plate; and a terminal bolt that is projected from the terminal, wherein the terminal bolt is supported separately from the top plate.

30. The battery module according to claim 27, further comprising a temperature detecting member that has a temperature detecting element on one face, the temperature detecting element detecting a temperature of each of the cells contained within each of the battery supports, wherein each of the battery supports has an opening formed in the side face, and the temperature detecting member is fitted into the opening.

31. An electric power storage system comprising:

the battery module according to claim 27; and a generator that generates electric power from renewable energy, wherein the battery module is charged by the generator.

32. An electric power storage system comprising:

the battery module according to claim 27; and an electronic apparatus connected to the battery module, wherein the electric power storage system supplies electric power to the electronic apparatus.

33. An electronic apparatus that receives supply of electric power from the battery module according to claim 27.

34. An electric vehicle comprising:

the battery module according to claim 27;

a converter that receives supply of electric power from the battery module, and converts the electric power into a drive force for the electric vehicle; and a controller that performs information processing related to vehicle control on a basis of information related to the battery module.

35. An electric power system comprising:

the battery module according to claim 27; and an electric power information transmitting and receiving unit that transmits and receives a signal to and from another apparatus via a network, wherein the electric power system controls charging and discharging of the battery module on a basis of information received by the electric power information transmitting and receiving unit.

36. An electric power system comprising:

the battery module according to claim 27;

a generator; and a power grid, wherein the electric power system receives supply of electric power from the battery module, or supplies electric power to the battery module from the generator or the power grid.

* * * * *